US012142158B2

(12) United States Patent
Kanasty et al.

(10) Patent No.: US 12,142,158 B2
(45) Date of Patent: Nov. 12, 2024

(54) STOMACH SIMULATING DEVICE

(71) Applicant: Lyndra Therapeutics, Inc., Watertown, MA (US)

(72) Inventors: Rosemary Kanasty, Cambridge, MA (US); Tyler Grant, Arlington, MA (US); John James Healy, Rexford, NY (US); Benjamin August Rothenberg Peterson, Portland, ME (US); Todd William Roberts, St. Inigoes, MD (US); Nathan Andrew Herrmann, Middlebury, VT (US); Erik Robert Waldemar Ryde, Boston, MA (US); David C. Dufour, Watertown, MA (US); Carmi Mandelkern, Watertown, MA (US); Jacob Freake, Watertown, MA (US); Kristofer Kurtin, Watertown, MA (US); Douglas Sabin, Watertown, MA (US)

(73) Assignee: LYNDRA THERAPEUTICS, INC., Watertown, MA (US)

( * ) Notice: Subject to any disclaimer, the term of this patent is extended or adjusted under 35 U.S.C. 154(b) by 642 days.

(21) Appl. No.: 17/297,956

(22) PCT Filed: Dec. 3, 2019

(86) PCT No.: PCT/US2019/064309
§ 371 (c)(1),
(2) Date: May 27, 2021

(87) PCT Pub. No.: WO2020/117855
PCT Pub. Date: Jun. 11, 2020

(65) Prior Publication Data
US 2022/0093006 A1 Mar. 24, 2022

Related U.S. Application Data

(60) Provisional application No. 62/774,802, filed on Dec. 3, 2018.

(51) Int. Cl.
*G09B 23/32* (2006.01)
*F04B 13/00* (2006.01)
*F04B 43/12* (2006.01)

(52) U.S. Cl.
CPC .............. *G09B 23/32* (2013.01); *F04B 13/00* (2013.01); *F04B 43/12* (2013.01)

(58) Field of Classification Search
CPC .......... G09B 23/28; G09B 23/30; G09B 23/32
See application file for complete search history.

(56) References Cited

U.S. PATENT DOCUMENTS 5,993,406 A * 11/1999 Rozga ................. A61M 1/1627
  604/6.09
6,022,733 A * 2/2000 Tam ...................... C12M 27/14
  435/298.2

(Continued)

FOREIGN PATENT DOCUMENTS

WO 2015191920 A1 12/2015
WO 2015191922 A1 12/2015

(Continued)

OTHER PUBLICATIONS

International Preliminary Report on Patentability, issued Jun. 8, 2021, for PCT Application No. PCT/US2019/064309, filed Aug. 13, 2019, 8 pages.

(Continued)

*Primary Examiner* — Kurt Fernstrom
(74) *Attorney, Agent, or Firm* — MORRISON & FOERSTER LLP

(57) ABSTRACT

Provided are stomach simulating devices and methods for simulating a stomach. Stomach simulating devices can comprise a bag-shaped conduit, a mechanical constrictor, and a valve. The conduit can have a body portion, a first diameter at an inlet portion, and a second diameter at an outlet portion, wherein the first diameter at the inlet portion is (Continued)

greater than the second diameter at the outlet portion, the body portion is located between the inlet portion and the outlet portion, and at least a portion of the conduit is curved in a direction from the inlet portion the outlet portion. The mechanical constrictor can he configured to constrict at least a portion of the body portion of the conduit. The valve can be configured to at least partially close a portion of the conduit closer to the outlet portion than the inlet portion of the conduit.

20 Claims, 22 Drawing Sheets

(56) References Cited

U.S. PATENT DOCUMENTS

| | | | |
|---|---|---|---|
| 8,092,222 B2 * | 1/2012 | Wickham | G09B 23/30 434/127 |
| 8,257,085 B2 * | 9/2012 | Alric | G09B 23/32 434/272 |
| 10,182,985 B2 | 1/2019 | Bellinger et al. | |
| 10,413,507 B2 | 9/2019 | Zhang et al. | |
| 10,517,819 B2 | 12/2019 | Bellinger et al. | |
| 10,517,820 B2 | 12/2019 | Bellinger | |
| 10,532,027 B2 | 1/2020 | Bellinger | |
| 10,596,110 B2 | 3/2020 | Bellinger | |
| 10,610,482 B2 | 4/2020 | Bellinger | |
| 10,716,751 B2 | 7/2020 | Bellinger et al. | |
| 10,716,752 B2 | 7/2020 | Bellinger et al. | |
| 10,849,853 B2 | 12/2020 | Bellinger et al. | |
| 10,953,208 B2 | 3/2021 | Zhang et al. | |
| 11,077,056 B2 | 8/2021 | Bellinger et al. | |
| 11,083,690 B2 | 8/2021 | Zhang et al. | |
| 11,246,829 B2 | 2/2022 | Bellinger et al. | |
| 11,357,723 B2 | 6/2022 | Bellinger et al. | |
| 11,389,399 B2 | 7/2022 | Bellinger et al. | |
| 11,557,226 B2 * | 1/2023 | Mascart | B01J 4/001 |
| 11,576,859 B2 | 2/2023 | Kanasty et al. | |
| 11,576,866 B2 | 2/2023 | Bellinger et al. | |
| 11,645,950 B2 * | 5/2023 | Chen | G09B 23/303 434/268 |
| 11,793,751 B2 | 10/2023 | Grant et al. | |
| 2006/0264983 A1 * | 11/2006 | Holsten | A61F 5/0079 606/153 |
| 2010/0286745 A1 * | 11/2010 | Imran | A61N 1/36007 607/40 |
| 2016/0317796 A1 | 11/2016 | Zhang et al. | |
| 2016/0351079 A1 * | 12/2016 | Legen | G09B 23/303 |
| 2017/0106099 A1 | 4/2017 | Bellinger | |
| 2017/0128576 A1 | 5/2017 | Zhang et al. | |
| 2017/0135954 A1 | 5/2017 | Bellinger et al. | |
| 2017/0266112 A1 | 9/2017 | Bellinger et al. | |
| 2018/0311154 A1 | 11/2018 | Bellinger et al. | |
| 2019/0070107 A1 | 3/2019 | Bellinger et al. | |
| 2019/0070108 A1 | 3/2019 | Bellinger et al. | |
| 2019/0125667 A1 | 5/2019 | Bellinger et al. | |
| 2019/0133936 A1 | 5/2019 | Bellinger et al. | |
| 2019/0175500 A1 | 6/2019 | Bellinger et al. | |
| 2019/0231697 A1 | 8/2019 | Bellinger et al. | |
| 2019/0254966 A1 | 8/2019 | Bellinger et al. | |
| 2019/0262265 A1 | 8/2019 | Bellinger et al. | |
| 2019/0298652 A1 | 10/2019 | Bellinger et al. | |
| 2020/0030234 A1 | 1/2020 | Zhang et al. | |
| 2020/0085736 A1 | 3/2020 | Bellinger et al. | |
| 2020/0085737 A1 | 3/2020 | Bellinger et al. | |
| 2020/0146979 A1 | 5/2020 | Kanasty | |
| 2020/0281851 A1 | 9/2020 | Grant et al. | |
| 2021/0093564 A1 | 4/2021 | Bellinger et al. | |
| 2021/0113460 A1 | 4/2021 | Bellinger et al. | |
| 2021/0128460 A1 | 5/2021 | Bellinger et al. | |
| 2021/0177750 A1 | 6/2021 | Bellinger et al. | |
| 2021/0196627 A1 | 7/2021 | Grant et al. | |
| 2022/0160642 A1 | 5/2022 | Bhise et al. | |
| 2022/0192995 A1 | 6/2022 | Kanasty et al. | |
| 2022/0387310 A1 | 12/2022 | Altreuter et al. | |
| 2022/0387311 A1 | 12/2022 | Kanasty et al. | |
| 2022/0387312 A1 | 12/2022 | Kanasty et al. | |
| 2022/0409528 A1 | 12/2022 | Kanasty et al. | |
| 2023/0039421 A1 | 2/2023 | Bellinger et al. | |
| 2023/0190941 A1 | 6/2023 | Montezco et al. | |
| 2024/0139102 A1 | 5/2024 | Grant | |

FOREIGN PATENT DOCUMENTS

| | | |
|---|---|---|
| WO | 2015191925 A1 | 12/2015 |
| WO | 2016178971 A1 | 11/2016 |
| WO | 2017070612 A1 | 4/2017 |
| WO | 2017100367 A1 | 6/2017 |
| WO | 2017205844 A2 | 11/2017 |
| WO | 2017205844 A3 | 1/2018 |
| WO | 2018064630 A1 | 4/2018 |
| WO | 2018227147 A1 | 12/2018 |
| WO | 2019060458 A1 | 3/2019 |
| WO | 2020036972 A1 | 2/2020 |
| WO | 2020117855 A1 | 6/2020 |
| WO | 2020191229 A1 | 9/2020 |
| WO | 2020191231 A1 | 9/2020 |
| WO | 2021092483 A1 | 5/2021 |
| WO | 2021092484 A1 | 5/2021 |
| WO | 2021092486 A1 | 5/2021 |
| WO | 2021092487 A1 | 5/2021 |
| WO | 2021092491 A1 | 5/2021 |
| WO | 2022159529 A1 | 7/2022 |
| WO | 2022236288 A1 | 11/2022 |
| WO | 2022236289 A1 | 11/2022 |
| WO | 2023141524 A2 | 7/2023 |
| WO | 2024031023 A2 | 2/2024 |
| WO | 2024073752 A2 | 4/2024 |

OTHER PUBLICATIONS

International Search Report and Written Opinion, mailed Feb. 6, 2020, for PCT Application No. PCT/US2019/064309, filed Aug. 13, 2019, 10 pages.

* cited by examiner

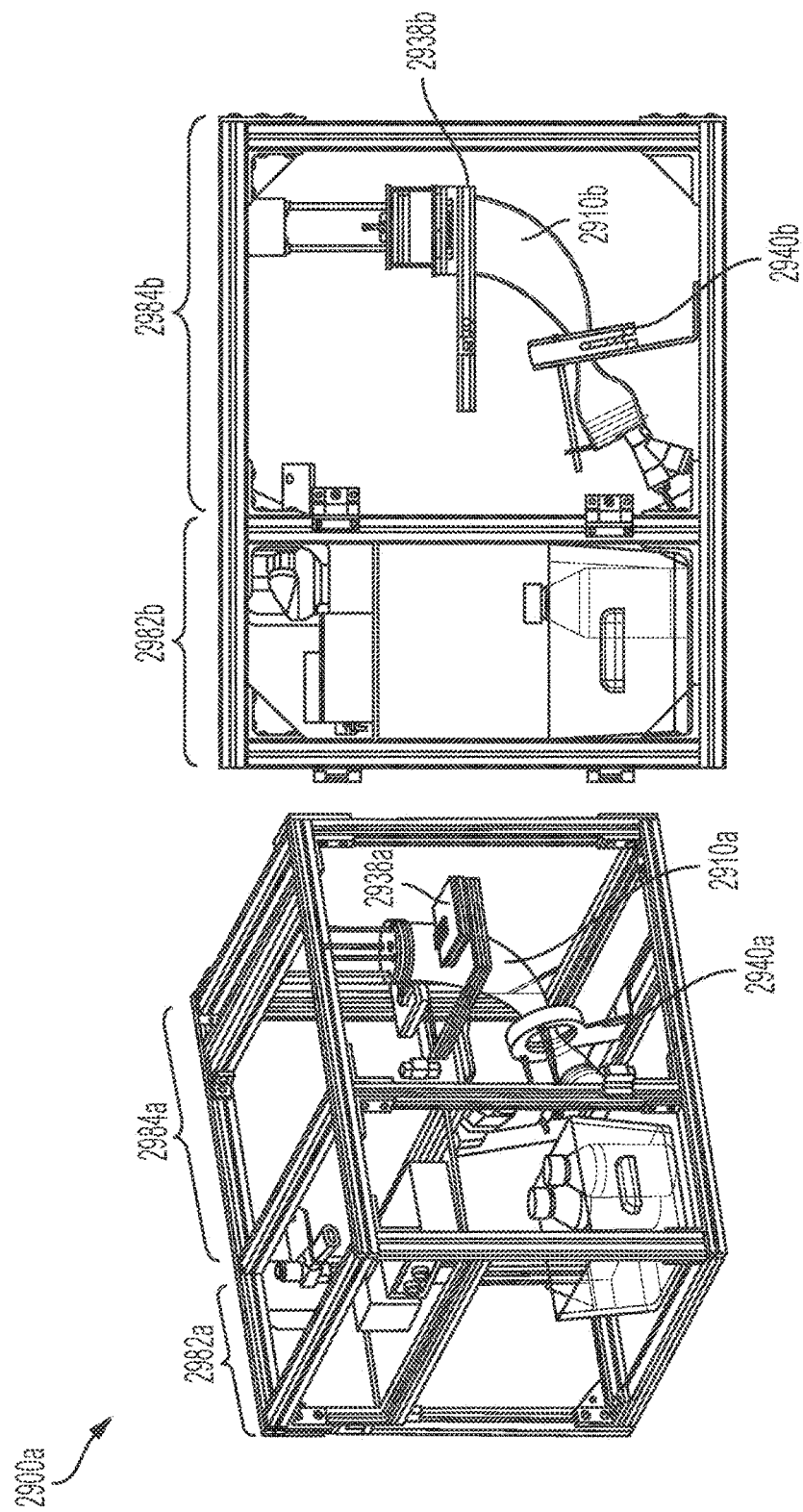

STOMACH SIMULATING DEVICE

CROSS-REFERENCE TO RELATED APPLICATIONS

This application is a national stage application under 35 U.S.C. § 371 of International Application No. PCT/US2019/064309, filed internationally on Dec. 3, 2019, which claims priority benefit of U.S. Provisional Patent Application No. 62/774,802 filed Dec. 3, 2018. The entire contents of that application are hereby incorporated by reference herein.

FIELD OF THE INVENTION

This relates to a stomach simulating device, and more particularly, an anatomically representative stomach simulating device capable of simulating the digestive forces in the human stomach.

BACKGROUND OF THE INVENTION

Medication nonadherence occurs when patients fail to take their medication as prescribed and is responsible for 10% of all hospitalizations. This costs the U.S. healthcare system $298 billion annually. Thus, several biopharmaceutical entities are working to address this problem by developing oral dosage forms that can remain in the stomach for a week or more. However, gastric retention of these oral dosage forms can depend on the mechanical and chemical interactions within the stomach. Thus, it is imperative that these oral dosage forms are thoroughly tested prior to commercialization.

Today, biopharmaceuticals such as oral dosage forms are frequently tested in vivo in animals, particularly dogs. However, in the case of oral dosage forms that are designed to remain in the stomach for a period of time, in vivo testing is costly and time consuming. Gastric resident dosage forms may be imaged using x-ray, but this method only yields discrete snapshots of the oral dosage form's status as it interacts with the stomach, which is insufficient for evaluating the dosage form's failure modes. The stomach's chemical characteristics and mechanical forces change as it goes through different digestive phases, subjecting the dosage form to an ever-changing environment between x-rays. Thus, crucial data on these oral dosage forms largely go unrecorded.

Furthermore, dog stomachs only represent some aspects of a human stomach. For example, a dog stomach is smaller than a human stomach. It is also subjected to stronger forces than a human stomach. Thus, the behavior of a dosage form in a dog stomach does not directly translate to the behavior of said dosage form in a human stomach.

Accordingly, several devices have been developed for in vitro testing, including the Human Gastric Simulator (HGS), the Neumann Model, the TNO Gastro-Intestinal Model (TIM), and the Bioneer's Dynamic Gastric Model.

The HGS is modelled by a latex bag hanging vertically from an aluminum chassis. Peristalsis motion is mimicked using rollers on a belt that cycle longitudinally along the side of the bag. The Neumann Model models the antral region with a straight uniform diameter silicone tube, and peristalsis is mimicked by running a pneumatic ring along the length of the silicone tube. An inlet port at the distal antral region allows for the introduction of simulated gastric fluids and particles. The TIM simulates the chemical environment produced in a stomach by controlling parameters such as pH, enzyme secretion, nutrient absorption, and temperature. Each section of the stomach is modeled by an elastomeric tube inside a chamber filled with water. The Bioneer's Dynamic Gastric Model is designed to mimic both the biochemical and mechanical environments of the human stomach by using a perforated ring fed by computer-controlled pumps to simulate gastric secretions. A piston pumps food and dosage forms of varying size and chemical makeup into the flexible main body of the Dynamic Gastric Model.

SUMMARY OF THE INVENTION

Provided are stomach simulating devices and methods for simulating a stomach. In particular, stomach simulating devices provided herein are anatomically representative of a human stomach and mechanically simulate the digestive forces that occur within a human stomach. Methods for simulating a stomach provided herein include inserting a dosage form to be tested into a stomach bag, and applying a radial force and displacement/distension to the bag while the dosage form is in the bag and a valve (i.e., representing the pylorus) at least partially constricts a portion of the bag closer to the outlet portion than the inlet portion of the bag.

A human stomach comprises a three-dimensional geometry that is a conical I-shaped design that tapers from approximately 100 mm diameter at the top to approximately 19 mm diameter at the bottom. Peristalsis is a series of propagating muscular contractions that push food through the stomach and grind it up, and the pylorus is a sphincter at the end of the stomach that opens and closes.

Unlike the MS, the Neumann Model, the TIM, and the Bioneer's Dynamic Gastric Model discussed above, stomach simulating devices according to embodiments described herein are specifically designed to accommodate in vitro testing of gastroretentive oral dosage forms using an anatomically representative model that simulates both the peristalsis mechanism and the pylorus function. For example, the HGS uses a plurality of cycling rollers that create consistent waves propagating from the top to the bottom of the stomach. However, these cycling rollers do not provide consistent pressure about the perimeter of the bag and cannot accurately simulate peristaltic contractions. The HGS also uses a vertical bag to represent the stomach, which fails to accurately portray the stomach curvature. The Neumann Model is not at all anatomically representative of a stomach, and in particular fails to mimic the curvature, the variable diameter of the antral region, or the pyloric sphincter. Further, the pneumatic ring used to simulate peristalsis requires consistent lubrication to prevent the silicone from wearing down. The TIM fails to simulate both peristalsis and pylorus motion. For example, the pylorus of the TIM is simulated by only a simple flow control valve. Finally, the Bioneer's Dynamic Gastric Model mimics both the chemical and mechanical aspects of food digestion in the stomach; however, it is not designed for gastric retention. For example, the pylorus is modeled only by a simple inlet valve, and the Dynamic Gastric Model focuses on the post-prandial phase of digestion.

Another key difference between the TIM and the Bioneer's Dynamic Gastric Model and stomach simulating devices provided herein is that the TIM and the Bioneer's Dynamic Gastric Model were designed to evaluate standard dosage forms only (i.e., tablets, powder-filled hard capsules, and/or liquid-filled softgels). Therefore, the TIM and the Bioneer's Dynamic Gastric Model focused predominately on drug absorption and disintegration behaviors due to interaction with food that occurred during the mixing digestive cycle of the stomach. Both the TIM and the Bioneer's Dynamic Gastric Model are incapable of simulating phase 3 of the migrating motor complex (MW), during which some of the most intense peristaltic waves occur and the pylorus is at least partially open to allow insoluble and/or indigestible particles to pass through to the intestines. Accordingly, embodiments of stomach simulating devices and methods of simulating a stomach provided herein include simulation of phase 3 MMC.

In some embodiments, a silicone bag is molded to mimic the shape of a stomach. The molded silicone bag can be fitted to a fluid system configured to simulate the fed and fasted digestive states. Mechanical forces may be created by two unique mechanisms that simulate peristalsis and the pylorus. For example, a mechanical constrictor can constrict the stomach bag while moving longitudinally down the bag to mimic the peristaltic waves of a stomach. Additionally, a valve can simulate the pylorus by selectively opening and closing to control the contents exiting the bag. The mechanical constrictor and the valve can work together to replicate the function of the human stomach (i.e., fed and tasted digestive phases), allowing dosage forms to be tested in vitro.

In some embodiments, a stomach simulating device is provided, the stomach simulating device comprising: a conduit having a body portion, a first diameter at an inlet portion, and a second diameter at an outlet portion, wherein the first diameter at the inlet portion is greater than the second diameter at the outlet portion, the body portion is located between the inlet portion and the outlet portion, and at least a portion of the conduit is curved in a direction from the inlet portion the outlet portion; a mechanical constrictor configured to constrict at least a portion of the body portion of the conduit; and a valve configured to at least partially close a portion of the conduit closer to the outlet portion than the inlet portion of the conduit.

In some embodiments of the stomach simulating device, the conduit comprises a J-shape.

In some embodiments of the stomach simulating device, the conduit comprises silicone.

In some embodiments of the stomach simulating device, a top opening of the conduit comprises a diameter of 3.0-8.0 inches.

In some embodiments of the stomach simulating device, the conduit comprises a minimum diameter in an unconstricted conduit of 0.25-2.0 inches.

In some embodiments of the stomach simulating device, the conduit comprises a wall thickness of 1-15 mm.

In some embodiments of the stomach simulating device, a diameter of the conduit continuously decreases in a direction from the inlet portion to the outlet portion.

In some embodiments of the stomach simulating device, the inlet portion of the conduit comprises a constant diameter from a first location to a second location of the conduit.

In some embodiments of the stomach simulating device, the outlet portion of the conduit comprises a constant diameter from a third location to a fourth location of the conduit.

In some embodiments of the stomach simulating device, the conduit comprises a first plurality of ribs along one or more of an interior surface or an exterior surface of the conduit.

In some embodiments of the stomach simulating device, the conduit comprises a second plurality of ribs, wherein the first plurality of ribs are closer to the inlet portion than the outlet portion of the conduit and the second plurality of ribs are closer to the outlet portion than the inlet portion of the conduit, wherein the first plurality of ribs is greater than the second plurality of ribs.

In some embodiments of the stomach simulating device, the first plurality of ribs comprises from 3-15 ribs and the second plurality of ribs comprises from 3-15 ribs.

In some embodiments of the stomach simulating device, the first plurality of ribs comprises from 8-15 ribs and the second plurality of ribs comprises from 3-10 ribs.

In some embodiments of the stomach simulating device, a material of the conduit comprises at least one of a silicone having a durometer of Shore 10 to 90A, a silicone having a durometer of Shore 00-30, and a silicone having a durometer of Shore 18A when measured using ASTM D2240.

In some embodiments of the stomach simulating device, the mechanical constrictor is configured to move longitudinally in a direction from the inlet portion to the outlet portion of the conduit.

In some embodiments of the stomach simulating device, the mechanical constrictor is configured to move longitudinally in a direction from the inlet portion to the outlet portion of the conduit by pivoting at a fixed point.

In some embodiments of the stomach simulating device, the mechanical constrictor is configured to move longitudinally in a direction from the inlet portion to the outlet portion of the conduit at a velocity from 1.0 mm/s to 20 mm/s.

In some embodiments of the stomach simulating device, the mechanical constrictor is configured to concentrically constrict the conduit.

In some embodiments of the stomach simulating device, the mechanical constrictor is configured to constrict the conduit by applying a force to a side of the conduit.

In some embodiments of the stomach simulating device, the mechanical constrictor is configured to apply a 5-75 kPa of pressure when constricting the conduit.

In some embodiments of the stomach simulating device, the mechanical constrictor comprises a bearing snake mechanism.

In some embodiments of the stomach simulating device, the valve comprises a circumferential valve.

In some embodiments of the stomach simulating device, the valve is configured to completely constrict the portion of the conduit closer to the outlet portion than the inlet portion of the conduit.

In some embodiments of the stomach simulating device, operation of the mechanical constrictor and operation of the valve are coordinated.

In some embodiments, a stomach conduit is provided, the stomach conduit comprising: a body portion; a first diameter at an inlet portion; and a second diameter at an outlet portion, wherein the first diameter at the inlet portion is greater than the second diameter at the outlet portion, the body portion is located between the inlet portion and the outlet portion, and at least a portion of the conduit is curved in a direction from the inlet portion the outlet portion.

In some embodiments of the stomach conduit, the conduit comprises a J-shape.

In some embodiments of the stomach conduit, the conduit comprises silicone.

In some embodiments of the stomach conduit, a top opening of the conduit comprises a diameter of 3.0-8.0 inches.

In some embodiments of the stomach conduit, the conduit comprises a minimum diameter in an unconstricted conduit of 0.25-2.0 inches.

In some embodiments of the stomach conduit, the conduit comprises a wall thickness of 1-15 mm.

In some embodiments of the stomach conduit, a diameter of the conduit continuously decreases in a direction from the inlet portion to the outlet portion.

In some embodiments of the stomach conduit, the inlet portion of the conduit comprises a constant diameter from a first location to a second location of the conduit.

In some embodiments of the stomach conduit, the outlet portion of the conduit comprises a constant diameter from a third location to a fourth location of the conduit.

In some embodiments of the stomach conduit, the conduit comprises a first plurality of ribs along one or more of an interior surface or an exterior surface of the conduit.

In some embodiments of the stomach conduit, the conduit comprises a second plurality of ribs, wherein the first plurality of ribs are closer to the inlet portion than the outlet portion of the conduit and the second plurality of ribs are closer to the outlet portion than the inlet portion of the conduit, wherein the first plurality of ribs is greater than the second plurality of ribs.

In some embodiments of the stomach conduit, the first plurality of ribs comprises from 3-15 ribs and the second plurality of ribs comprises from 3-15 ribs.

In some embodiments of the stomach conduit, the first plurality of ribs comprises from 8-15 ribs and the second plurality of ribs comprises from 3-10 ribs.

In some embodiments of the stomach conduit, a material of the conduit comprises a durometer of 10 to 90A when measured using ASTM D2240.

In some embodiments of a stomach simulating device, the stomach simulating device comprises: a conduit having a body portion, a first diameter at an inlet portion, and a second diameter at an outlet portion, wherein the first diameter at the in portion is located between the inlet portion and the outlet portion, and at least a portion of the conduit is curved in a direction from the inlet portion the outlet portion; and a mechanical constrictor configured to constrict at least a portion of the body portion of the conduit.

In some embodiments of the stomach simulating device, the conduit comprises a J-shape.

In some embodiments of the stomach conduit, the conduit comprises silicone.

In some embodiments of the stomach conduit, a top opening of the conduit comprises a diameter of 3.0-8.0 inches.

In some embodiments of the stomach conduit, the conduit comprises a minimum diameter in an unconstricted conduit of 0.25-2.0 inches.

In some embodiments of the stomach conduit, the conduit comprises a wall thickness of 1-15 mm.

In some embodiments of the stomach conduit, a diameter of the conduit continuously decreases in a direction from the inlet portion to the outlet portion.

In some embodiments of the stomach conduit, the inlet portion of the conduit comprises a constant diameter from a first location to a second location of the conduit.

In some embodiments of the stomach conduit, the outlet portion of the conduit comprises a constant diameter from a third location to a fourth location of the conduit.

In some embodiments of the stomach conduit, the conduit comprises a first plurality of ribs along one or more of an interior surface or an exterior surface of the conduit.

In some embodiments of the stomach conduit, the conduit comprises a second plurality of ribs, wherein the first plurality of ribs are closer to the inlet portion than the outlet portion of the conduit and the second plurality of ribs are closer to the outlet portion than the inlet portion of the conduit, wherein the first plurality of ribs is greater than the second plurality of ribs.

In some embodiments of the stomach conduit, the first plurality of ribs comprises from 3-15 ribs and the second plurality of ribs comprises from 3-15 ribs.

In some embodiments of the stomach conduit, the first plurality of ribs comprises from 8-15 ribs and the second plurality of ribs comprises from 3-10 ribs.

In some embodiments of the stomach conduit, a material of the conduit comprises a durometer of 10 to 90A when measured using ASTM D2240.

In some embodiments of the stomach conduit, the mechanical constrictor is configured to move longitudinally in a direction from the inlet portion to the outlet portion of the conduit.

In some embodiments of the stomach conduit, the mechanical constrictor is configured to move longitudinally in a direction from the inlet portion to the outlet portion of the conduit by pivoting at a fixed point.

In some embodiments of the stomach conduit, the mechanical constrictor is configured to move longitudinally in a direction from the inlet portion to the outlet portion of the conduit at a velocity from 1.0 mm/s to 20 mm/s.

In some embodiments of the stomach conduit, the mechanical constrictor is configured to concentrically constrict the conduit.

In some embodiments of the stomach conduit, the mechanical constrictor is configured to constrict the conduit by applying a force to a side of the conduit.

In some embodiments of the stomach conduit, the mechanical constrictor is configured to apply a 5-75 kPa of pressure when constricting the conduit.

In some embodiments of the stomach conduit, the mechanical constrictor comprises a bearing snake mechanism.

In some embodiments, a stomach simulating device is provided, the stomach simulating device comprising: a conduit having a body portion, a first diameter at an in portion, and a second diameter at an outlet portion, wherein the first diameter at the inlet portion is greater than the second diameter at the outlet portion, the body portion is located between the inlet portion and the outlet portion, and at least a portion of the conduit is curved in a direction from the inlet portion the outlet portion; and a valve configured to at least partially close a portion of the conduit closer to the outlet portion than the inlet portion of the conduit.

In some embodiments of the stomach simulating device, the conduit comprises a J-shape.

In some embodiments of the stomach simulating device, the conduit comprises silicone.

In some embodiments of the stomach simulating device, a top opening of the conduit comprises a diameter of 3.0-8.0 inches.

In some embodiments of the stomach simulating device, the conduit comprises a minimum diameter in an unconstricted conduit of 0.25-2.0 inches.

In some embodiments of the stomach simulating device, the conduit comprises a wall thickness of 1-15 mm.

In some embodiments of the stomach simulating device, a diameter of the conduit continuously decreases in a direction from the inlet portion to the outlet portion.

In some embodiments of the stomach simulating device, the inlet portion of the conduit comprises a constant diameter from a first location to a second location of the conduit.

In some embodiments of the stomach simulating device, the outlet portion of the conduit comprises a constant diameter from a third location to a fourth location of the conduit.

In some embodiments of the stomach simulating device, the conduit comprises a first plurality of ribs along one or more of an interior surface or an exterior surface of the conduit.

In some embodiments of the stomach simulating device, the conduit comprises a second plurality of ribs, wherein the first plurality of ribs are closer to the inlet portion than the outlet portion of the conduit and the second plurality of ribs are closer to the outlet portion than the inlet portion of the conduit, wherein the first plurality of ribs is greater than the second plurality of ribs.

In some embodiments of the stomach simulating device, the first plurality of ribs comprises from 3-15 ribs and the second plurality of ribs comprises from 3-15 ribs.

In some embodiments of the stomach simulating device, the first plurality of ribs comprises from 8-15 ribs and the second plurality of ribs comprises from 3-10 ribs.

In some embodiments of the stomach simulating device, a material of the conduit comprises a durometer of 10 to 90A when measured using ASTM D2240.

In some embodiments of the stomach simulating device, the mechanical constrictor is configured to move longitudinally in a direction from the inlet portion to the outlet portion of the conduit.

In some embodiments of the stomach simulating device, the mechanical constrictor is configured to move longitudinally in a direction from the inlet portion to the outlet portion of the conduit by pivoting at a fixed point.

In some embodiments of the stomach simulating device, the mechanical constrictor is configured to move longitudinally in a direction from the inlet portion to the outlet portion of the conduit at a velocity from 1.0 mm/s to 20 mm/s.

In some embodiments of the stomach simulating device, the mechanical constrictor is configured to concentrically constrict the conduit.

In some embodiments of the stomach simulating device, the mechanical constrictor is configured to constrict the conduit by applying a force to a side of the conduit.

In some embodiments of the stomach simulating device, the mechanical constrictor is configured to apply a 5-75 kPa of pressure when constricting the conduit.

In some embodiments of the stomach simulating device, the mechanical constrictor comprises a bearing snake mechanism.

In some embodiments of the stomach simulating device, the valve comprises a circumferential valve.

In some embodiments of the stomach simulating device, the valve is configured to completely constrict the portion of the conduit closer to the outlet portion than the inlet portion of the conduit.

In some embodiments of the stomach simulating device, operation of the mechanical constrictor and operation of the valve are coordinated.

In some embodiments, a method of simulating a stomach is provided, the method comprising: inserting a dosage form to be tested into an inlet portion of a conduit; the conduit having a body portion located between the inlet portion and an outlet portion, wherein at least a portion of the conduit is curved in a direction from the inlet portion the outlet portion; applying a radial force to the conduit while the dosage form is in the conduit and a valve at least partially constricts a portion of the conduit closer to the outlet portion than the inlet portion of the conduit.

In some embodiments of the method, the method comprises determining a time period that the dosage form remains in the conduit.

In some embodiments of the method, the time period is greater than 6 hours.

In some embodiments of the method, the time period is greater than 12 hours.

In some embodiments of the method, the time period is greater than 18 hours.

In some embodiments of the method; the time period is greater than 1 day.

In some embodiments of the method, the time period is greater than 1 week.

In some embodiments of the method, the method simulates multiple digestive cycles.

In some embodiments of the method, applying a radial force to the conduit comprises applying a force to a side of the conduit.

In some embodiments of the method, applying a radial force to the conduit comprises concentrically constricting the conduit.

In some embodiments of the method, applying a radial force to the conduit comprises using a mechanical constrictor.

In some embodiments of the method, the method comprises moving the mechanical constrictor in a longitudinal direction from the inlet portion to the outlet portion of the conduit.

In some embodiments of the method, the valve comprises a circumferential valve.

In some embodiments of the method, the valve is configured to completely constrict the portion of the conduit closer to the outlet portion than the inlet portion of the conduit.

In some embodiments of the method, applying a radial force to the conduit comprises coordinating the radial force and the valve operation.

In some embodiments of the method, the dosage form is a gastroretentive dosage form.

In some embodiments of the method, the dosage form comprises an active pharmaceutical ingredient.

In some embodiments, a stomach simulating device is provided, the stomach simulation device comprising: a conduit having a body portion, a first inner diameter, and a second inner diameter, and an outer diameter, wherein the first inner diameter is larger than the second inner diameter; and a plurality of cable constrictors, wherein each cable constrictor of the plurality of cable constrictors is configured to constrict a portion of the body portion of the conduit.

In some embodiments of the stomach simulating device, an exterior surface of the conduit is cylindrical.

In some embodiments of the stomach simulating device, the conduit comprises silicone.

In some embodiments of the stomach simulating device, an opening of the conduit comprises a diameter of 30-60 mm.

In some embodiments of the stomach simulating device, the conduit comprises a minimum diameter in an unconstricted conduit of 15-30 mm.

In some embodiments of the stomach simulating device, the conduit comprises a wall thickness of 1-15 mm.

In some embodiments of the stomach simulating device, the conduit comprises a plurality of circumferential channels along the exterior surface.

In some embodiments of the stomach simulating device, a first cable constrictor of the plurality of cable constrictors wraps around an exterior circumference of the conduit.

In some embodiments of the stomach simulating device, the first cable constrictor is positioned within a first circumferential channel.

In some embodiments of the stomach simulating device, the plurality of cable constrictors is bonded to the stomach bag with silicone.

In some embodiments of the stomach simulating device, the plurality of cable constrictors comprises 10-20 cable constrictors.

In some embodiments of the stomach simulating device, the conduit comprises a first silicone of durometer 00-30 and a second silicone of durometer 18A as measured using ASTM D2240.

In some embodiments of the stomach simulating device, each cable constrictor of the plurality of cable constrictors comprises a looped steel wire wrapped with a polyester rope, and each cable constrictor is configured to concentrically constrict a portion of the body portion of the conduit when the circumference of the steel wire decreases.

In some embodiments of the stomach simulating device, the cable constrictor is configured to concentrically constrict the conduit when one or more ends of the looped steel wire are pulled to decrease the circumference of the steel wire.

In some embodiments of the stomach simulating device, constriction of each cable constrictor of the plurality of cable constrictors is coordinated.

In some embodiments of the stomach simulating device, the stomach bag is configured to rotate from a horizontal position to a vertical position, and from the vertical position to the horizontal position.

BRIEF DESCRIPTION OF THE DRAWINGS

The invention will now be described, by way of example only, with reference to the accompanying drawings, in which:

FIG. 29a is a perspective view of a stomach simulating device, according to some embodiments;

FIG. 29b is a front view of a stomach simulating device, according to some embodiments;

DETAILED DESCRIPTION OF THE INVENTION

Figure 1:
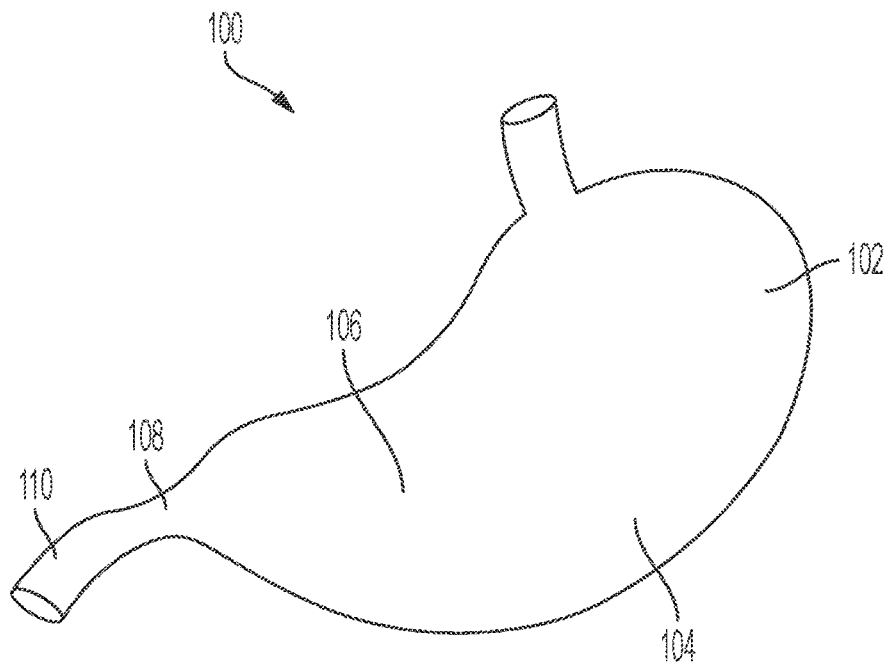
FIG. 1 is a diagram illustrating the five main regions of the human stomach.

Described herein are stomach simulating device and methods of simulating a stomach. In some embodiments, the stomach simulating device includes an anatomically-shaped stomach bag. In some embodiments, the stomach simulating device includes a mechanical constrictor to simulate the peristalsis motion of a real stomach. In some embodiments, the stomach simulating device includes a valve configured to simulate the pylorus function of a real stomach. In some embodiments, the peristalsis mechanism and the pylorus mechanism of a stomach simulating device can be coordinated to replicate fed and fasted digestive phases.

Stomach simulating devices provided herein can have a curved stomach bag-shaped conduit comprising an elastomeric material. The curvature of the stomach bag-shaped conduit can help simulate an oral dosage form's journey through a stomach, particularly the tumbling motion interaction with the stomach wall that can occur with the curved shape. The vertical and horizontal bags/tubes of the models described above cannot replicate this behavior.

Additionally, the material of a stomach bag according to embodiments provided herein has particular material properties. For example, elastic properties and hardness properties of a stomach bag may help the bag rebound after being constricted by the peristaltic and/or pylorus mechanisms, maintain its shape over a period of time, and resist any tears or other failures that may be caused by the repeated peristaltic and pyloric forces.

In some embodiments, stomach simulating devices can include a mechanical constrictor to simulate peristalsis motion. As described below, peristalsis is a wave-like force that constricts a stomach to help break up food and push it through the stomach to the intestines. In some embodiments, the mechanical constrictor is configured to apply pressure radially while moving down a length of the stomach bag to simulate peristalsis.

In some embodiments, stomach simulating devices can include a valve to simulate the pylorus function. As described below, the pylorus function selectively opens and closes the pylorus (i.e., narrow passage located towards the bottom of the stomach) to either retain materials within the stomach or allow materials to pass through the stomach to the intestines. In some embodiments, the valve is configured to circumferentially constrict the pylorus region to retain materials within the stomach bag. In some embodiments, the valve operation can be coordinated with the mechanical constrictor discussed above to simulate fed and fasted digestive phases.

Accordingly, provided herein are stomach simulating devices and methods for simulating a stomach that can include an anatomically representative stomach bag, a mechanical constrictor (configured to simulate peristalsis) and a valve (configured to simulate pylorus function)

Anatomy and Physiology of the Stomach

Following is a description of a stomach of an animal, such as a human. Stomach simulating devices provided herein are designed to simulate any or all of the features of the stomach described below. In particular, stomach simulating devices can include several anatomical and physiological functions of the stomach described below, including the anatomical curvature of the stomach, the peristalsis motion, and the pylorus function.

FIG. 1 illustrates the five regions of stomach 100. Stomach 100 includes fundus 102, corpus 104, antrum 106, pylorus 108, and duodenum 110.

Food empties from the esophagus into fundus 102, the most proximal region of stomach M0. Little, if any, mechanical forces exist in fundus 102. The next most proximal region is corpus 104. Corpus 104 is the main body of stomach 100 and can be up to 245 mm in length and 100 mm in diameter. Antrum 106 is surrounded by the thickest muscles and is responsible for the strongest mechanical grinding forces. Antrum 106 varies in diameter from 30-60 mm and can be up to 80 mm long. Stomach 100 terminates at the pyloric sphincter (i.e., pylorus 108), an annular valve that opens and closes to allow processed food particles into the rest of the gastrointestinal tract. Pylorus 108 can open as wide as 19 mm in diameter and is on average 15 min in length. The next region of the gastrointestinal tract is duodenum 110 which is the most proximal region of the small intestine.

Figure 2:
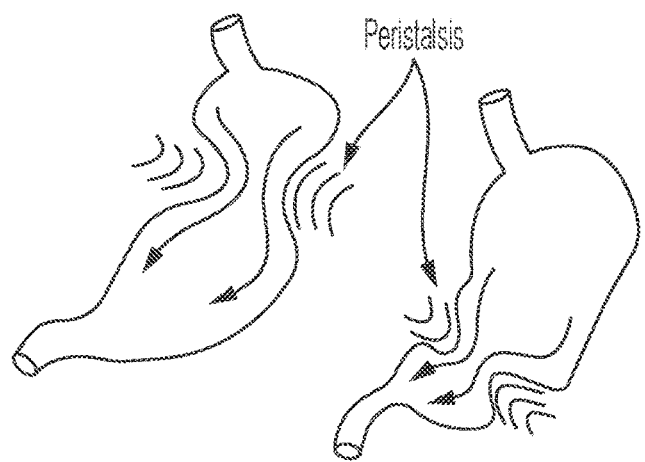
FIG. 2 is a diagram illustrating peristalsis of a human stomach.

The primary method for moving food boluses through stomach 100 (and the rest of the gastrointestinal tract) is peristalsis. Peristalsis is the involuntary constriction and relaxation of the muscles of stomach 100 (or other region of the gastrointestinal tract) that creates wavelike movements that push contents of stomach 100 forward. Food is broken down chemically and mechanically within stomach 100 to a size that is safe to pass into the rest of the gastrointestinal tract (i.e., 1-2 mm). Peristalsis is responsible for the mechanical side of food disintegration. The intensity and speed of peristaltic waves varies greatly across the four regions of the stomach and during different states of digestion. These contractions are approximately 18 mm in height and can constrict a cross section of the stomach up to 100%. FIG. 2 demonstrates a graphical representation of peristalsis.

At any given time; stomach 100 is in one of two states: (1) the post-prandial; or (2) the migrating motor complex (MMC). The post-prandial state, otherwise known as the fed state, occurs right after the consumption of food and can last up to 3.5 hours. Peristaltic wave contractions during the post-prandial state can reach pressure values of up to 2.76 kPa. These waves begin approximately 15 cm above pylorus 108 and propagate at a rate of 1.5-3 mm/s. Post-prandial waves occur with a frequency of three per minute.

The MMC, or fasted state, occurs at all other times and is broken into four distinct phases. Phase 1 lasts 40-60 minutes and is characterized by small, sporadic contractions. Phase 2 lasts 30-45 minutes during which the intensity of the contractions increases slightly. Phase 3 lasts only 10-15 minutes, but is characterized by the strongest mechanical contractions of the MMC. Specifically, pressures of phase 3 waves ("housekeeping" waves) of the MCC can reach up to 34.5 kPa. Housekeeping waves increase in propagation rate as they, approach pylorus 108 with a maximum of 7.5 mm/s. The primary function of phase 3 is to empty stomach 100 of any large, non-digestible objects. This is also where pylorus 108 is at its most open state (i.e., 19 min in diameter). Phase 4 of the MCC represents the transition back to phase 1, where the cycle begins again.

Tables 1 and 2, below, provide a breakdown of the stomach's dimensional and dynamic specifications during both the post-prandial and migrating motor complex phases.

TABLE 1

Anatomical and physiological dimensional specifications of human stomach.

| Region of Stomach | Digestive Phase | Diameter (mm) | Length (mm) | Volume (mL) | % Constriction |
|---|---|---|---|---|---|
| Corpus | MMC: Phase 3 | — | 245 | 17 | — |
|  | Post-Prandial | 100 max. | 245 | 418 | 0-40 |
| Antrum | MMC: Phase 3 | 25 | 80 max. | — | 40-100 |
|  | Post-Prandial | 30-60 | 80 max. | 180 | 40 |
| Pylorus | MMC: Phase 3 | 19 max. | 15 | — | 100 |
|  | Post-Prandial | 1-2 | 15 | — | 90 |

TABLE 2

Anatomical and physiological dynamic specifications of human stomach.

| Region of Stomach | Digestive Phase | Pressure (kPa) | Wave Frequency (waves/min) | Wave Velocity (mm/s) | Wave Thickness (mm) |
|---|---|---|---|---|---|
| Corpus | MMC: Phase 3 | 34.5 | 2.8 | 3.0 | 18 |
|  | Post-Prandial | 2.8 | 3.0 | 1.5-3.0 | 18 |
| Antrum | MMC: Phase 3 | 34.5 | 2.8 | 3.3-7.5 | 18 |
|  | Post-Prandial | 2.1 | 3.0 | 2.5 | 18 |
| Pylorus | MMC: Phase 3 | N/A | 0.8 | N/A | N/A |
|  | Post-Prandial | N/A | 5.4 | N/A | N/A |

Anatomically Representative Stomach Bag

Following is a description of a bag-shaped conduit that mimics one or more features of the stomach described above, including: (1) the anatomical shape, (2) the size of a patient's; and/or (3) the elastic properties of the stomach. Each of these features is discussed in turn below, Anatomical Shape of the Stomach Conduit The shape of a stomach bag according to embodiments provided herein may mimic one or more of the fundus, the corpus, the antrum, and/or the pylorus regions of a real stomach. As described above, these regions are uniquely shaped and the stomach as a whole may be characterized as "J-shape".

As shown in FIG. 1, the anatomy of stomach 100 is characterized by the curvature of the different major regions. Fundus 102 and corpus 104 align to form a near vertical section of the stomach that leads into the curved antral region (i.e., antrum 106), ending at the horizontal pylorus 108. Together, these four sections combine to form a shape. Representing this 'J' shape of the stomach may help a user effectively examine how a dosage form rests upon the stomach wall in different regions of the stomach. For example, if the stomach were to be approximated as a straight vertical tube, the dosage form could fall straight to the pyloric region without ever contacting a peristaltic wave. By using the T curve as a central axis, the stomach can be modeled with rotational symmetry about that axis. This rotational symmetry eases modeling the propagation of peristaltic waves.

Figure 3A:
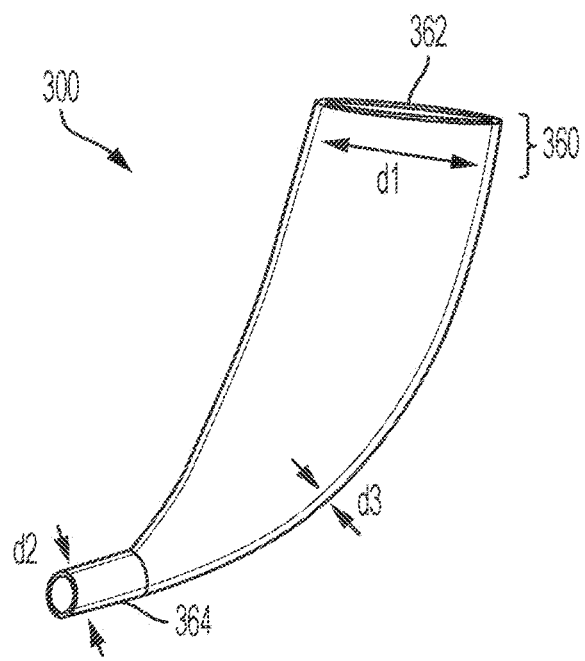
FIG. 3a shows a front view of a stomach bag comprising a pylorus termination, according to some embodiments.

Thus, stomach simulating devices according to some embodiments provided herein comprise a molded stomach hag that is designed to replicate this curved "J" shape. FIG. 3a shows stomach bag 300 according to some embodiments. In some embodiments, stomach bag 300 may be designed to model the shape of the antrum, corpus, and the pylorus of a stomach. In some embodiments, stomach bag 300 may be designed to model the shape of the fundus of a stomach. As shown in FIG. 3a, one or more openings of the stomach bag 300 may include a linear portion 360 to allow for the bag to easily stretch over the fluid control bulkheads and form a seal.

Size of the Stomach Conduit

The size of a stomach hag according to embodiments provided herein may vary in size to model different sized stomachs. For example, the size of a stomach bag may vary depending upon whether it is designed to model the stomach of a male, a female, an adult, and/or a child.

Figure 3B:
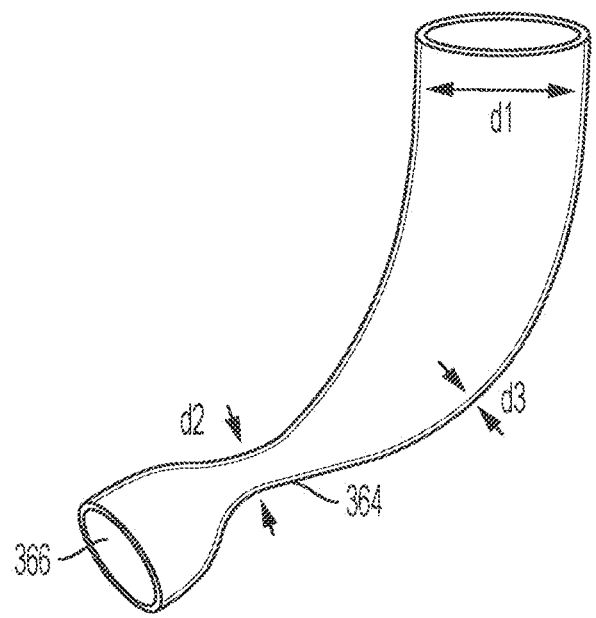
FIG. 3b shows a front view of a stomach bag comprising a post-pylorus bulkhead attachment, according to some embodiments.

Accordingly, certain features of stomach bag 300 of FIGS. 3a and 3b may vary in size to model different sized stomachs. For example, certain areas of stomach bag 300 such as inlet opening 362, pyloric region 364, antral region diameter (i.e., d1), and pyloric region diameter (i.e., d2) may vary depending upon the design of stomach bag 300.

In some embodiments, inlet opening 362 of the stomach bag 300 may comprise a diameter of 75-200 mm, 100-175 mm, or 125-150 mm. In some embodiments, inlet opening 362 may comprise a diameter of less than 200 mm, less than 175 mm, less than 150 mm, less than 125 mm, or less than 100 mm. In some embodiments, inlet opening 362 may comprise a diameter of greater than 75 mm, greater than 100 mm, greater than 125 mm, greater than 150 mm, or greater than 175 mm.

In some embodiments, pyloric region 364 of stomach bag 300 may comprise a diameter of 5-50 mm, 10-40 mm, or 20-30 mm. In some embodiments, pyloric region 364 may comprise a diameter of less than 50 mm, less than 40 mm, 30 mm, less than 20 mm, or less than 10 mm. In some embodiments, pyloric region 364 may comprise a diameter of greater than 5 mm, greater than 10 mm, greater than 20 mm, greater than 30 mm, or greater than 40 mm.

D1 of FIGS. 3a and 3b represents a diameter of the antral region of stomach bag 300. In some embodiments, d1 may be 70-130 mm, 80-120 mm, or 90-110 mm. In some embodiments, d1 may be less than 130 mm, less than 120 mm, less than 11.0 mm, less than 100 mm, less than 90 mm, or less than 80 mm. In some embodiments, d1 may be more than 70 mm, more than 80 mm, more than 90 mm, more than 100 mm, more than 110 mm, or more than 120 mm.

D2 of FIGS. 3a and 3b represents a diameter of the pyloric region of stomach bag 300. In some embodiments, d2 may be 10-30 mm or 15-25 mm. In some embodiments, d2 may be less than 30 mm, less than 25 mm, less than 20 mm, or less than 15 mm. In some embodiments, d2 may be more than 10 mm, more than 15 mm, more than 20 mm, or more than 25 mm.

Additionally, stomach simulating devices according to some embodiments provided herein may include features to enable a user using the stomach simulating device to test dosage forms. For example. FIG. 3b shows stomach bag 300 that may be configured to allow a user to retrieve broken oral dosage forms once they pass through the pylorus and into the duodenum. In particular, stomach bag 300 of FIG. 3b shows outlet opening 366 flaring out from pyloric region 364 and having a larger diameter than pyloric region 364. In some embodiments, this larger outlet opening 366 may be used to accommodate a port for fluid flow as well as a port for retrieval of broken dosage forms.

D3 of FIGS. 3a and 3b represents a wall thickness of stomach bag 300. In some embodiments, d3 may be 1-15 mm. In some embodiments, d3 may be less than 15 mm, less than 12 mm, less than 10 mm, less than 8 mm, less than 6 mm, or less than 3 mm. In some embodiments, d3 may be more than 1 mm, more than 3 mm, more than 5 mm, more than 8 mm, more than 10 mm, or more than 12 trim. In some embodiments, a wall thickness of stomach bag 300 may remain constant throughout the entire stomach bag 300. In some embodiments, a wall thickness of stomach bag 300 may vary throughout stomach bag 300.

Elastic Properties of the Stomach Conduit

A stomach bag according to embodiments provided herein may be designed to mimic some of the physical characteristics of a real stomach. In particular, the material of the stomach is resistant to the acidic gastric fluids and can undergo numerous repeated constriction forces over a lone period of time without tearing or collapsing. Additionally, the stomach rebounds, or bounces back, to its original shape once the constriction forces are removed. In some embodiments, a material composition and a wall thickness may be chosen to mimic this rebounding behavior of the stomach. In some embodiments, the material of stomach bag 300 may also be optically transparent, enabling a user to observe a dosage form throughout digestion.

In some embodiments, stomach bag 300 may comprise one or more materials such as silicone, a thermoplastic polyurethane, a thermoplastic elastomer, or any other suitable elastomer. In some embodiments, the material of stomach bag 300 may have a durometer of 5-100A or 10-90A (A-scale). These durometer values can be tested using ASTM D2240. In some embodiments, the material of stomach bag 300 may have an A-scale durometer of less than 100A, less than 90A, less than 80A, less than 70A, less than 60A, less than 50A, less than 40A, less than 30A, or less than 20A. In some embodiments, the material of stomach bag 300 may have an A-scale durometer of more than 5A, more than 10A, more than 20A, more than 30A more than 40A, more than 50A, more than 60A, or more than 70A.

As described above, stomach bag 300 may be designed to undergo repeated folding as a result of the peristaltic and/or pyloric mechanisms. To encourage controlled folding during constriction, a stomach bag may include a plurality of "ribs" running, a length of (an interior surface and/or an exterior surface of) a stomach bag to promote folding in specific areas. The "ribs" may provide more certainty about where folds are formed during constriction and how many folds are formed along a length of the stomach bag.

In particular, stomach bag 300 may include a plurality of ribs to simulate the folding configuration of a real stomach when constricted. When the real stomach constricts into a peristaltic wave, the muscles in the stomach wall contract with near radial symmetry to reach full constriction. This ensures that the peristaltic wave is consistently pushing the stomach contents towards the pylorus. The peristaltic mechanism of some stomach simulating devices (discussed in detail below) can apply uniform pressure about the bag; however, it cannot guarantee that the bag will fold in a controlled manner when it is constricted. The bag may have a tendency fold irregularly, which can leave openings at the perimeter of constriction.

Figure 4:
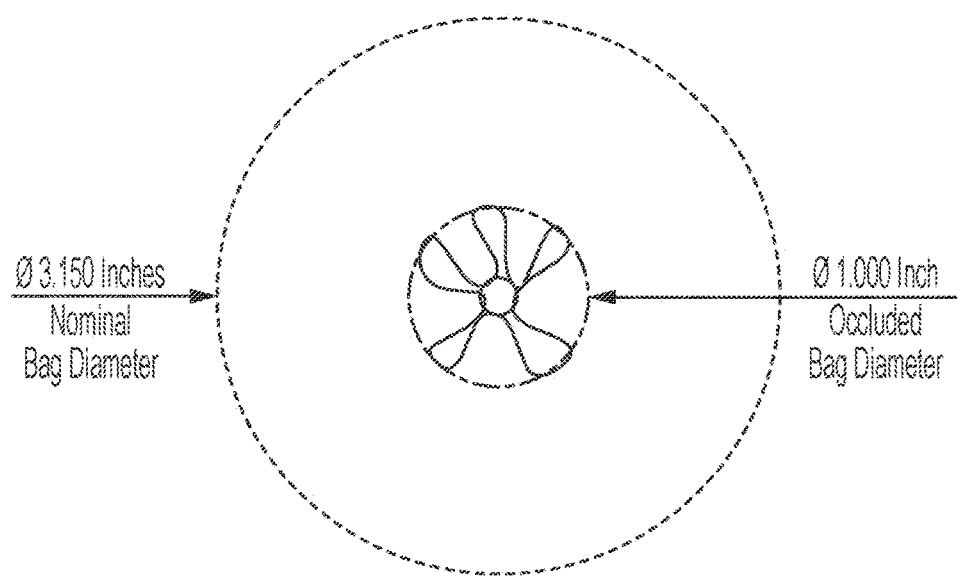
FIG. 4 shows a cross-sectional view of a constricted stomach bag, according to some embodiments.

FIG. 4 illustrates a cross-sectional view of a non-uniform folded stomach bag 400. Stomach bag 400 includes, for example, a non-constricted diameter of 3.150 inches and a constricted diameter of 1.000 inch. As shown, the folds of the stomach bag of FIG. 4 are not symmetric. This lack of symmetry can leave openings in the bag, preventing 100% constriction.

In some embodiments, non-uniform folding of stomach bag 400 may be more prevalent in areas of larger diameter (i.e., the antral and/or corpus regions). In some embodiments, irregular folding may not have an adverse impact on stomach bag 400 if it is still being fully constricted to the constricted diameter. In some embodiments, irregular, non-uniform folding of stomach bag 400 may have an adverse impact on stomach bag 400 even if it is still fully constricted to the constricted diameter.

Accordingly, a stomach bag may include a plurality of ribs to improve predictability of folding, repeatability of folding, and/or to achieve 100% constriction. Because the ribs may run along a length of a stomach bag, they are depicted as waves in a cross-sectional view of a stomach bag. For example, various rib configurations are provided in FIGS. 5a-5e, discussed below. The number of waves at the pylorus and the antrum may be determined by each cross section's constricted radius. The constricted radius of a stomach bag may be determined by identifying the nominal cross-sectional area, identifying a fully-constricted cross-sectional area, identifying a fully constricted radius, and identifying a length of the period of the wave that travels about the perimeter.

Eight waves are shown in FIGS. 5b, 5c, 5d, and 5e (pylorus cross-section). However, twelve waves are shown in FIG. 5a (antrum cross-section). In some embodiments, the number of ribs (i.e., waves as shown in the cross-sectional views of FIGS. 5a-5e) organically transitions from a first number of ribs to a second number of ribs as they travel upwards along the bag from the pylorus to the antrum. This organic transition may reduce stress concentrations and allow for easier removal from the mold. However, some embodiments may include a consistent number of ribs (i.e., waves) between the pylorus and antral regions.

Further, the number of ribs (i.e., waves) is not limited to eight or twelve. The number of ribs a stomach bag comprises may depend upon processing/manufacturability, folding predictability, folding repeatability, amount of constriction, etc. In some embodiments, stomach bag may include from 1-25 ribs, from 2-20 ribs, from 4-15 ribs, or from 6-12 ribs. In some embodiments, a pylorus region may include more than 1 rib, more than 2 ribs, more than 3 ribs, more than 4 ribs, more than 5 ribs, more than 6 ribs, more than 8 ribs, more than 10 ribs, more than 12 ribs, more than 15 ribs, more than 18 ribs, more than 20 ribs, or more than 22 ribs. In some embodiments, a pylorus region may include less than 25 ribs, less than 22 ribs, less than 20 ribs, less than 18 ribs, less than 15 ribs, less than 12 ribs, less than 10 ribs, less than 8 ribs, less than 5 ribs, or less than 3 ribs. In some embodiments, the ribs may be spaced non-uniformly about a circumference of the stomach bag. In some embodiments, the ribs may be space non-uniformly about a circumference of a stomach bag.

The length of the ribs may depend upon processing/manufacturability, folding predictability, folding repeatability, amount of constriction, etc. In some embodiments, one or more ribs may extend a distance from 20-80%, from 30-70%, or from 40-60% of the stomach bag (as measured with respect to the distance between the inlet opening and the outlet opening of the stomach bag). In some embodiments, one or more ribs may extend more than 20%, more than 30%, more than 40%, more than 50%, more than 60%, or more than 70%. In some embodiments, one or more ribs may extend less than 80%, less than 70%, less than 60%, less than 50%, or less than 40% of the stomach bag.

Figures 5A, 5B, 5C, 5D, 5E:
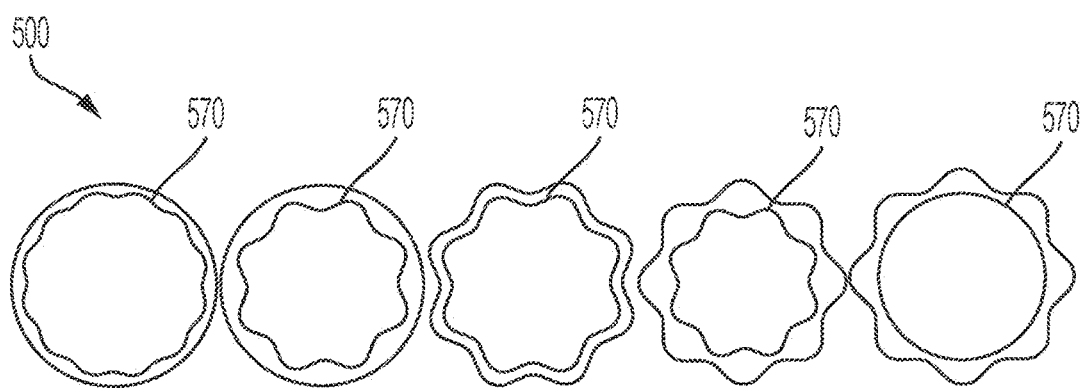
FIG. 5a is a cross-sectional view of a stomach bag, according to some embodiments.
FIG. 5b is a cross-sectional view of a stomach bag, according to some embodiments.
FIG. 5c is a cross-sectional view of a stomach bag, according to some embodiments.
FIG. 5d is a cross-sectional view of a stomach bag, according to some embodiments.
FIG. 5e is a cross-sectional view of a stomach bag, according to some embodiments.

FIG. 5a shows a cross-sectional view of stomach bag 500 comprising a plurality of ribs 570 spaced uniformly about an interior surface of stomach bag 500. In particular, the diameter of stomach bag 500 of FIG. 5a is larger than that of FIG. 5b (below). Thus, as described above, the cross-section of FIG. 5a may be located at a wider area of the stomach bag 500 (e.g., the antrum). When the diameter of stomach bag 500 is constricted, a plurality of folds begins to protrude towards an interior of stomach bag 500. When stomach bag 500 is constricted, each fold (one fold per rib 570) may be the same length.

FIG. 5b shows a cross-sectional view of stomach bag 500 comprising a plurality of ribs 570 spaced uniformly about an interior surface of stomach bag 500. The diameter of stomach bag 500 in FIG. 5b is smaller than that of FIG. 5a. For example, the cross-section of stomach bag 500 of FIG. 5b may be located closer to the pylorus of stomach bag 500, where the diameter is naturally smaller. When the diameter of stomach bag 500 is constricted, a plurality of folds begins to protrude towards an interior of stomach bag 500. When stomach bag 500 is constricted, each fold (one fold per rib 570) may be the same length.

FIG. 5c shows a cross-sectional view of stomach bag 500 comprising stacked ribs 570 along both an interior surface and an exterior surface of stomach bag 500. In some embodiments, the wall thickness of the ribs may be uniform, as shown in FIG. 5c. Unlike the stomach bag 500 of FIG. 5a and the stomach bag 500 of FIG. 5b, the stomach bag 500 of FIG. 5c comprises a constant wall thickness across the entire circumference of stomach bag 500 (shown) and along a length of stomach bag 500. Thus, the folding of stomach bag 500 of FIG. 5c upon constriction relies on the shape of ribs 570, and not any variation in wall thickness. Conversely, the folding stomach bag 500 of FIG. 5a and stomach bag 500 of FIG. 5b upon constriction can rely both on the shape of ribs 570 and the variation in wall thickness. In some embodiments, the thinner portions of the wall will require less three to fold than the thicker portions of the wall.

FIG. 5d shows a cross-sectional view of stomach bag 500 comprising off-set ribs 570. Specifically, stomach bag 500 of FIG. 5d includes ribs 570 running along an interior surface of stomach bag 500 and along an exterior surface of stomach bag 500. However, unlike the ribs of stomach bag 500 of FIG. 5c that were stacked, ribs 570 of stomach bag 500 of FIG. 5d are off-set. Thus, the wall thickness of stomach bag 500 of FIG. 0.5d is not uniform across the circumference of stomach bag 500.

Figure 5e shows a cross-sectional view of stomach bag 500 comprising a plurality of ribs 570 along an exterior surface of stomach bag 500 and a smooth interior surface. As shown in the Figure, the wall thickness varies and is not uniform.

Figure 6:
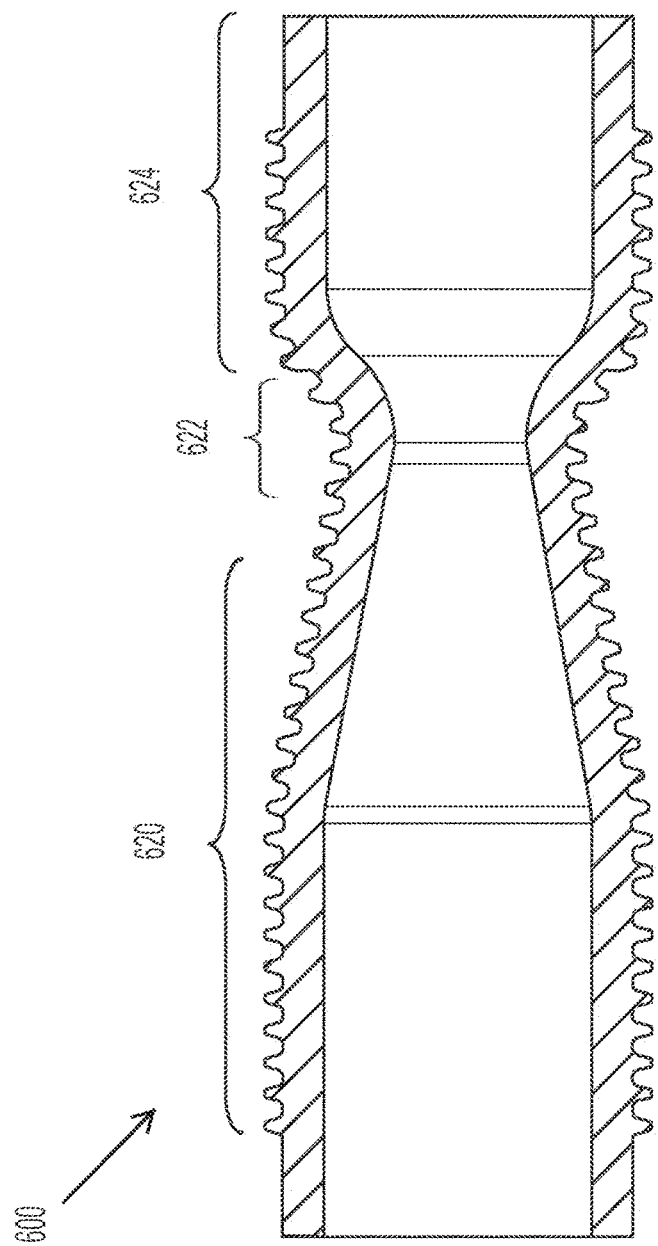
FIG. 6 shows a stomach bag, according to some embodiments.

FIG. 6 shows a stomach bag 600 according to some embodiments. As shown, stomach bag 600 comprises varying interior diameters and wall thicknesses. In some embodiments, the antrum 620, pylorus 622, and duodenum region 624 of the stomach are each represented by stomach bag 600. The actual diameters of each region can be varied to mimic various sizes and stomach states (i.e., fed or fasted state).

In some embodiments, the antrum region 620 may have a diameter of 30-60 mm. In some embodiments, the antrum region 620 may have a diameter of less than 60 mm, less than 50 mm, or less than 40 mm. In some embodiments, the antrum region 620 may have a diameter of more than 30 mm, more than 40 mm, or more than 50 mm. In some embodiments, the pylorus region 622 may have a diameter of 15-30 mm. In some embodiments, the pylorus region 622 may have a diameter of less than 30 mm, less than 25 mm, or less than 20 mm. In some embodiments, the pylorus region 622 may have a diameter of more than 15 mm, more than 20 mm, or more than 25 mm. In some embodiments, the duodenum 624 may have a diameter of 30-60 mm. In some embodiments, the duodenum 624 may have a diameter of less than 60 mm, less than 50 mm, or less than 40 mm. In some embodiments, the duodenum 624 may have a diameter of more than 30 mm, more than 40 mm, or more than 50 mm.

Additionally, the lengths of each region i.e., the antrum 620, the pylorus 622, and the duodenum 624) may be varied based on the intended behaviors the stomach simulator is designed to mimic. For example, as shown, stomach bag 600, the duodenum 624 is shorter than the antrum region 620 because stomach bag 600 is particularly designed to study residence in the antrum. However, this design could reasonably be reversed (i.e., the antrum 620 shorter than the duodenum region 624) to study the reverse. In some embodiments, the length of the antrum region 620 may be 50-300 mm. In some embodiments, the length of the antrum region 620 may be less than 300 mm, less than 250 mm, less than 200 mm, less than 150 mm, or less than 100 mm.

In some embodiments, the length of the antrum region 620 may be more than 50 mm, more than 100 mm, or more than 150 mm. In some embodiments, the length of the duodenum region 624 may be 50-300 mm. In some embodiments, the length of the duodenum region 624 may be less than 300 mm, less than 250 mm, less than 200 mm, less than 150 mm, or less than 100 mm. In some embodiments, the length of the duodenum region 624 may be more than 50 min, more than 100 mm, or more than 150 mm.

Further, the wall thickness of the stomach bag can be modified in various locations/sections to mimic gradient muscle tone along the length of the stomach. See FIG. 7 and corresponding discussion for further detail on this feature.

A stomach bag according to embodiments described herein can be manufactured several different ways. For example, a stomach bag may be fabricated using extrusion methods, blow forming methods, and/or liquid polymer molding methods. In some embodiments, a custom mold can be machined and filled with room temperature liquid polymer. For example, the liquid polymer may be vulcanizing (RTV) silicone. Preparing a custom mold to use with room temperature liquid elastomer instead of other methods including high temperature injection molding can allow for the relatively quick fabrication and iteration of the stomach bag and can be more cost effective.

The stiffness of a stomach bag may be optimized to more closely represent a real stomach. In some embodiments, a stomach bag may be constructed of silicone or thermoplastic elastomers. In some embodiments, a stomach bag may be constructed of a single silicone (i.e., such that the stomach bag has a single durometer throughout). In some embodiments, a stomach bag may be constructed of two or more silicones. In some embodiments, each silicone of the two or more silicones may have a different durometer (i.e., such that the stomach bag has different durometers at different locations). For example, specific locations of the stomach bag may be constructed such that they are stiffer (i.e., the pylorus). In some embodiments, a stomach bag thickness (i.e., as measured from an inner diameter to an outer diameter of the stomach bag) may be layered with two or more silicones of different durometers. In some embodiments, the durometer of the silicone(s) used to construct a stomach bag may be from Shore 00-20 to Shore 30A. For example, a stomach bag may be constructed comprising a base of Shore 00-30 with a coating of Shore 18A extending from the antrum region to the duodenum region.

Example of Stomach Bag Stiffness

Figure 7:
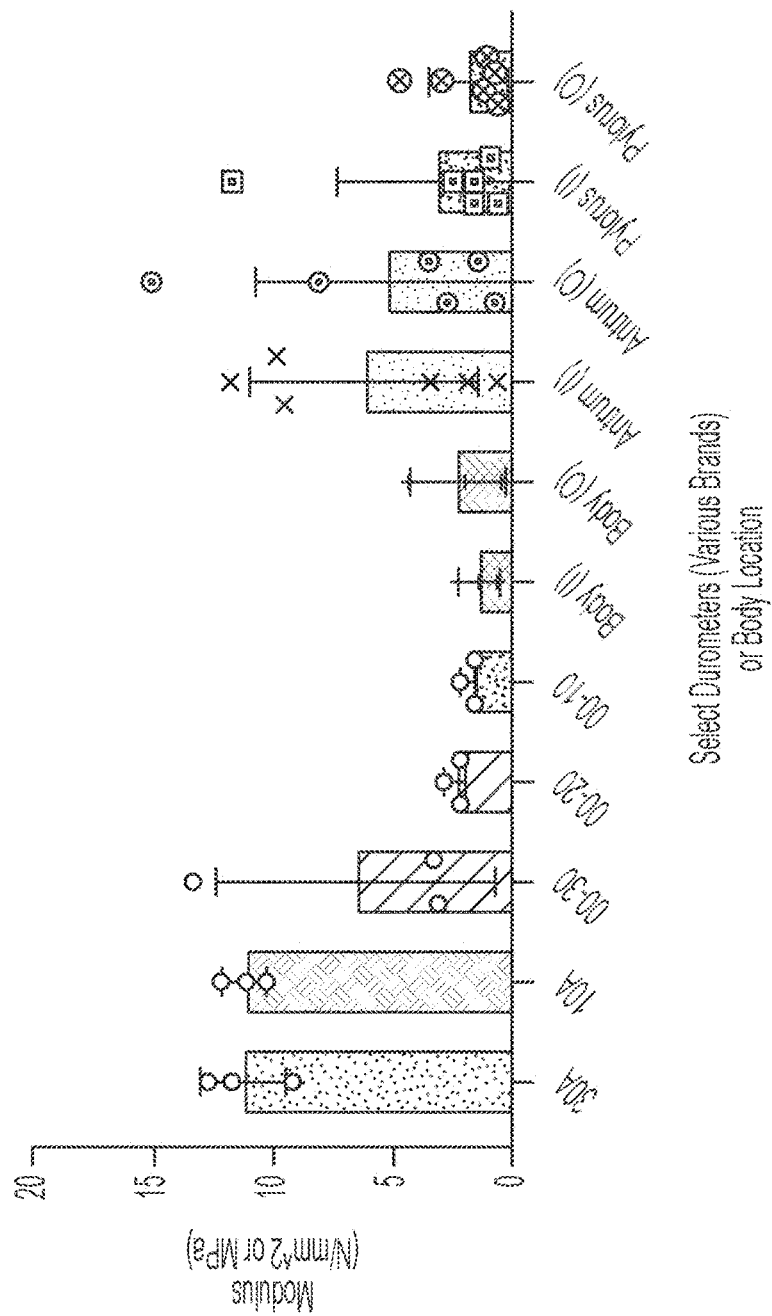
FIG. 7 shows modulus testing results of various types of silicones and various locations of a pig stomach.

An ex vivo pig stomach was sectioned and tested under compression to determine the actual stiffness of various locations of a real (i.e., pig) stomach. FIG. 7 shows the modulus testing results of various types of silicones and various locations of an ex vivo pig stomach. The "I" and "O" corresponding to the various pig stomach measurements indicate whether the measurement was obtained from the interior (I) of the pig stomach or the exterior (O) of the pig stomach. Based on the results, different silicone materials, each of a different durometer, may be combined to most closely replicate the stiffness of a real stomach.

Peristaltic Mechanism

Following is a description of various peristaltic mechanisms that can simulate one or more features of the peristalsis motion of a real stomach. As described above, the peristaltic motion of a human stomach includes both wave contraction (i.e., radial motion) and wave propagation (i.e., longitudinal motion) simultaneously. Accordingly, peristalsis mechanisms provided herein can mimic one or more features of the peristalsis motion of a real stomach, including: (1) wave contraction (i.e., radial motion); and (2) wave propagation (i.e., longitudinal motion). Each of these features is discussed in turn below.

Wave Contraction (i.e., Radial Motion) of a Peristaltic Mechanism

Peristaltic mechanisms described herein can mimic the wave contraction motion of peristalsis of a real stomach by repeatedly applying pressure circumferentially to the stomach bag.

By definition, wave contraction is the manipulation of the stomach's cross-sectional diameter from its resting state. Tables 1 and 2, provided above, show data on a peristaltic wave of a real stomach. Specifically, Table 1 shows that during the MMC Phase 3 the peristaltic wave achieves up to 100% constriction. This means that at a maximum amplitude of the muscular wave, the cross-sectional diameter of the stomach effectively goes to zero.

Additionally, Table 2 states that a maximum pressure of 34.5 kPa occurs in the corpus and antrum during MMC phase 3 of a real stomach. This pressure is defined as a physical pressure as opposed to a fluid pressure. In other words, if a pressure measurement device was positioned on the inside of the stomach wall, it would output a maximum of 34.5 kPa as the peristaltic wave constricted upon it.

The pressure applied by a peristaltic mechanism of a stomach simulating device can depend upon the size, shape, and material of the bag, as well as the stomach environment a user is mimicking. In some embodiments, the pressure of a peristaltic mechanism may be from 5-75 kPa, from 15-50 kPa, or from 30-40 kPa. In some embodiments, the pressure of a peristaltic mechanism may be less than 75 kPa, less than 65 kPa, less than 50 kPa, less than 45 kPa, less than 40 kPa, less than 35 kPa, less than 30 kPa, less than 20 kPa, less than 15 kPa, or less than 10 kPa. In some embodiments, the maximum pressure may be more than 5 kPa, more than 10 kPa, more than 15 kPa, more than 25 kPa, more than 30 kPa, more than 35 kPa, more than 40 kPa, more than 50 kPa, more than 60 kPa, or more than 65 kPa.

FIGS. 8-15 provide examples of various mechanical constrictors designed to apply a force in a wave-like manner to a stomach bag to achieve at least partial constriction. Specifically, these mechanical constrictors include a sheathed bearing snake, a translating pneumatic donut, an annular roller bearing frame, a bearing snake mechanism, and a cable constrictor mechanism. Each mechanical constrictor is discussed in detail below.

Figure 8:
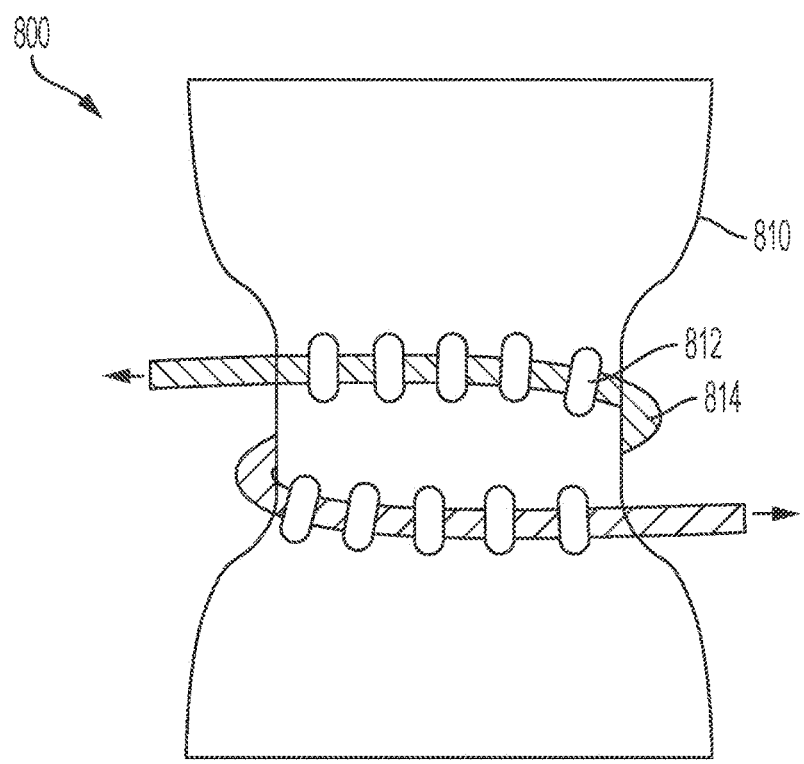
FIG. 8 is a close-up view of a peristalsis mechanism, according to some embodiments.

FIG. 8 shows a close-up view of a sheathed bearing snake mechanism 800 according to some embodiments. Sheathed bearing snake mechanism 800 is one example of a peristaltic wave contraction mechanism. Sheathed bearing snake mechanism 800 uses radial bearings 812 (e.g., a piece of spring steel or similar material) assembled on an elastic core 814. A sheath (e.g. heat shrink tubing) is placed over the bearings to mitigate any potential pinch points on stomach bag 810. Sheathed bearing snake mechanism 800 may also include linear actuators on each end of elastic core 814. When the linear actuators cause each end of the sheathed bearing snake mechanism 800 to pull in the direction of the arrows, the bearing snake can close around the stomach bag 810, simulating wave contraction. Sheathed bearing snake mechanism 800 can achieve rolling contact on the stomach bag as it moves longitudinally up and down, it can limit the amount of pinch points, and it can comprise a relatively simple drive design with two linear actuators to manipulate the diameter of the wave.

Figure 9:
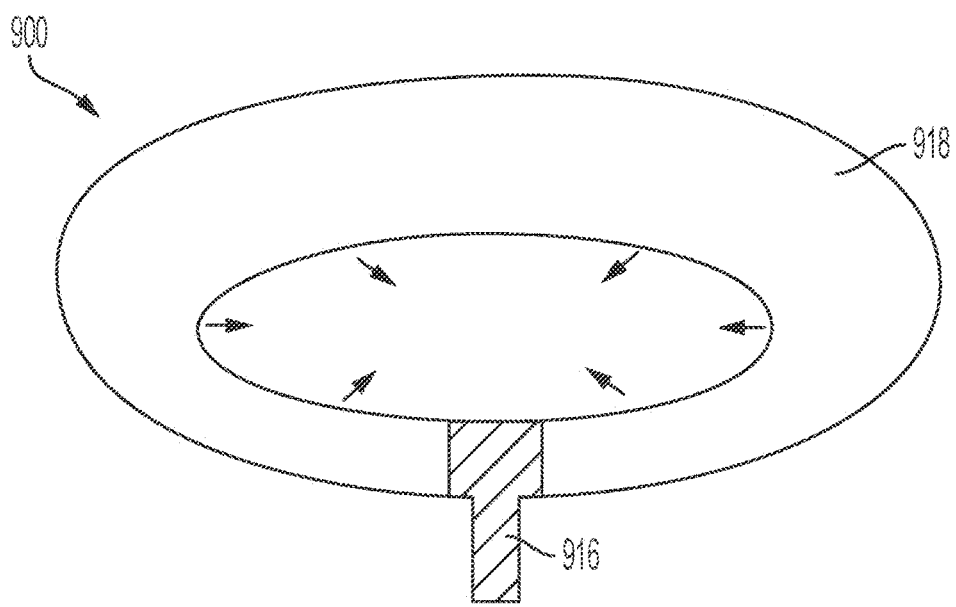
FIG. 9 shows a peristalsis mechanism, according to some embodiments.

FIG. 9 shows a close-up view of a translating pneumatic donut mechanism 900 according to some embodiments. Translating pneumatic donut 900 comprises tee valve 916 and donut 918. Mechanism 900 can be configured to constrict around a stomach bag (in the direction of the arrows) to mimic the peristaltic wave motion. In some embodiments, a radial bearing may be located on either end of tee valve 916 to allow the donut to roll as it is propagated down the stomach.

Figure 10:
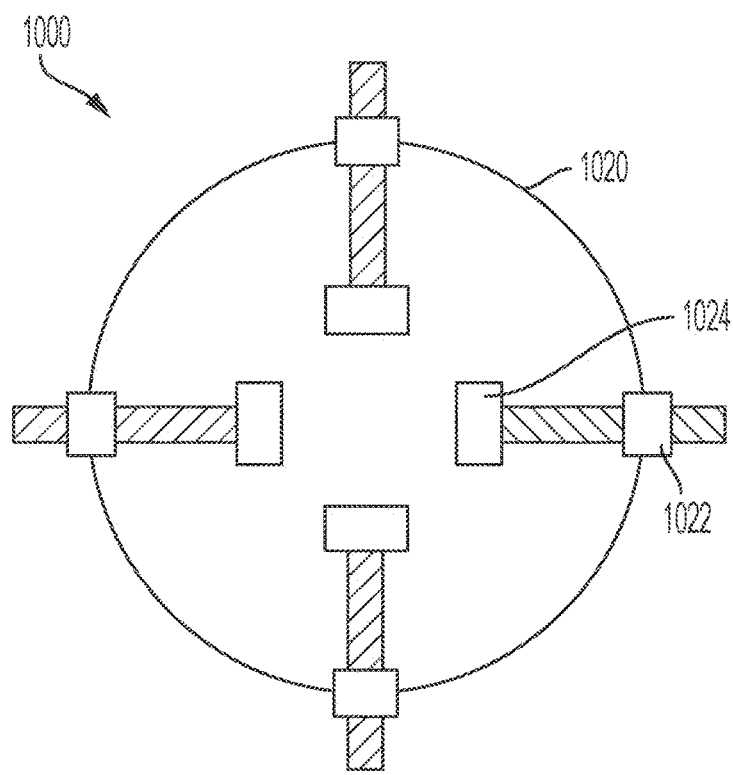
FIG. 10 shows a peristalsis mechanism, according to some embodiments.

FIG. 10 shows a close-up view of an annular roller bearing frame 1000 according to some embodiments. Annular roller bearing frame 1000 comprises an annular frame 1020, screws 1022, and roller bearings 1024. As shown in the Figure, each one of four roller bearings 1024 are actuated by a screw 1022 equally spaced around annular frame 1020. This concept achieves continuous concentricity as the simulated wave contracts and allows for rolling contact as the wave propagates down the stomach.

Figure 11:
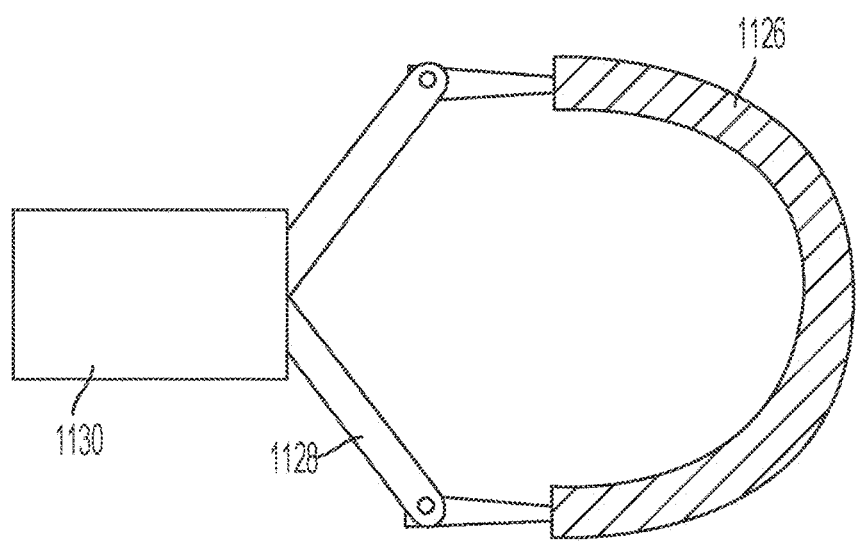
FIG. 11 shows a peristalsis mechanism, according to some embodiments.

FIG. 11 is a bearing snake mechanism 1100 according to some embodiments. Bearing snake mechanism 1100 includes bearing snake 1126, frame 1128, and linkage 1130. Bearing snake mechanism 1100 features some aspects of sheathed bearing snake mechanism 800 including the sheathed radial bearings combined with aspects of annular roller bearing frame 1000. In some embodiments, bearing snake mechanism 1100 includes two bearing snakes that are actuated simultaneously, each by a separate linkage 1130. As the linkages 1130 are moved away from each other, the radii of both bearing snakes 1126 decrease at the same rate, effectively decreasing the diameter of the wave while maintaining a circular geometry and concentricity with the stomach.

In some embodiments, two bearing snake mechanisms may interlock when surrounding a stomach bag. For example, two bearing snakes may interlock at an offset angle (e.g., 2-10°) to propagate a peristaltic wave through the stomach bag. The center point of the interlocked bearing snake mechanisms should be along the center axis of the stomach bag to best simulate the natural peristaltic waves of a human stomach.

Figure 12A:
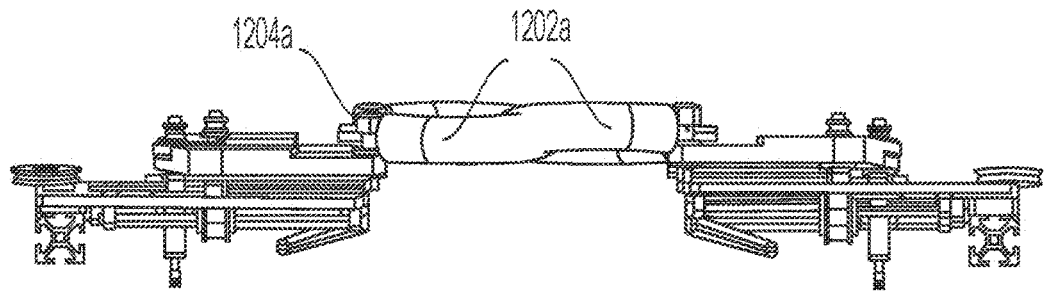
FIGS. 12A &12B show two different perspectives of an interlocking bearing snake mechanism, according to some embodiments.
Figure 12B:
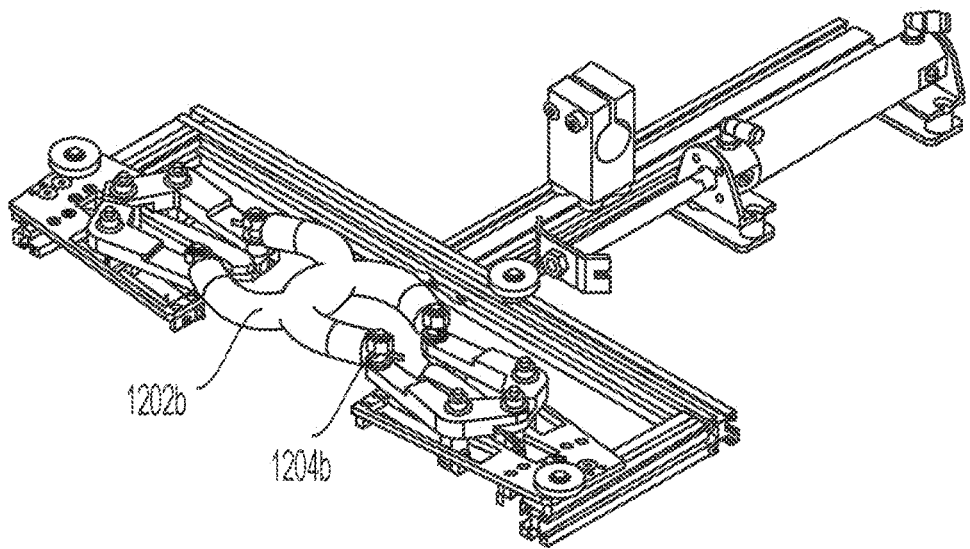

FIGS. 12A and 12B show two different perspectives of an interlocking bearing snake mechanism. In particular, FIG. 12A shows the offset created to enable the interlocking of the two bearing snakes 1202a. The offset angle may vary and may be dependent upon the thickness of bearing snake 1202a. In some embodiments, the offset angle may be 2-10°. In some embodiments, the offset angle may be less than 10°, less than 7°, or less than 4°. In some embodiments, the offset angle may be more than 2°, more than 4°, or more than 7°.

FIG. 12B shows a different perspective of an interlocking bearing snake mechanism. In particular, FIG. 12B shows bearing snake mounts 1204a. The bearing snake mounts 1204b where bearing snake 1202b is mounted to the frame may be rotatable to improve wear life and performance (e.g., reduce stress in bearing snake caused by repeated bending).

In some embodiments, instead of a sheathed bearing snake having a spring steel core with roller bearings, the hearing snake may be constructed of an extension spring and/or foam. A bearing snake comprising a foam roller instead of roller bearings can help provide a better simulated (i.e., more biomimetic) constriction wave onto a stomach bag. A bearing snake comprising an extension spring instead of a spring steel core may help create a more elastic peristaltic wave.

In some embodiments, a lubrication may be applied to the exterior of a stomach bag to reduce friction between a bearing snake mechanism and the stomach bag. In some embodiments, lubrication may be applied within a stomach bag to mimic the lubricity of the stomach wall and the lubricity of the mucus layer within the stomach. For example, suitable lubrication materials may include petroleum jelly (ranging from industrial grade to Vaseline®) or water-based lubricants comprising glycerol and hydroxyethylcellulose. Preferred materials for the stomach bag lubrication include a cohesive hydrophobic substance or a hydrophilic layer.

Figure 13:
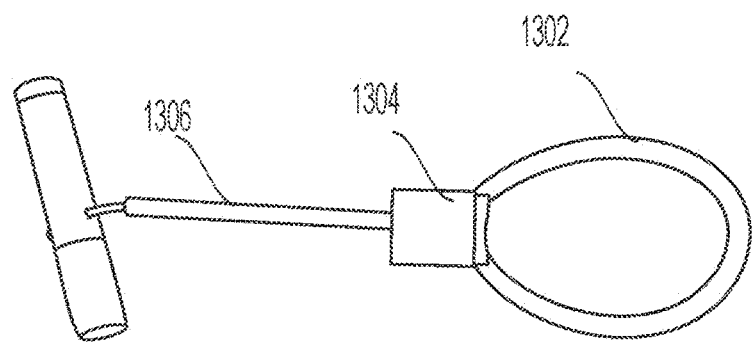
FIG. 13 shows a cable constriction mechanism, according to some embodiments.

FIG. 13 shows a cable constriction system that may be used to mimic peristalsis. In some embodiments, the cable constriction system may be capable of providing a peristaltic wave having a relatively steep slope. Wave slope is defined as the instantaneous change in radius per unit of linear length on the interior surface of the conduit. Peristaltic waves with steeper slopes have the potential to more easily promote motion of objects through a conduit. This is at least partially because the normal force between the wave and the object is aligned more closely with the direction of the central axis of the conduit.

Cable constriction mechanisms provided herein may be able to achieve a wave with a steep slope because it can use actuators that are narrow (require relatively little linear length of the conduit). Narrow actuators can create a steep restriction in the interior surface of the conduit and allow the restriction to be translated along the central axis of the conduit via sequential actuations.

Soft (low durometer) conduit materials can allow for large differences between the unrestricted interior surface of the conduit and the restricted interior surface of the conduit over a relatively short linear length. Pressurizing the interior volume of the conduit increases the diameter of the unrestricted portion of the conduit creating an even steeper slope.

In some embodiments, a cable constriction mechanism may be able to provide a peristaltic wave having a slope steeper than that achievable by the previously-described bearing snake design.

As shown in FIG. 13, a cable constriction mechanism comprises braided "lasso" sheath 1302, hub 1304, and cable 1306. Braided "lasso" sheath 1302 comprises a steel wire wrapped with a braided sheath (e.g., polyester rope). The braided sheath protects the silicone from abrasion. Hub 1304 houses two ends of braided "lasso" sheath 1302 that combine and pass through hub 1304. When cable 1306 is pulled away from hub 1304, it pulls the steel wire within the braided sheath of the braided "lasso" sheath 1302 through hub 1304, decreasing the radius of braided "lasso" sheath 1302. When braided "lasso" sheath 1302 encircles a stomach bag, the pull of cable 1306 and decreasing of the radius of braided "lasso" sheath 1302 functions to impart a peristaltic wave/mechanism onto the stomach bag. When cable 1306 is pulled and the radius of braided "lasso" sheath 1302 decreases, the braided sheath surrounding the steel wire of braided "lasso" sheath 1302 remains mounted to hub 1304, yet still contracts (i.e., decreases in radius) with the steel wire.

In some embodiments, a stomach simulating device provided herein may comprise a cable constriction mechanism that propagates up and down the length of the stomach bag of the stomach simulating device to mimic peristaltic waves. In some embodiments, a stomach simulating device provided herein may comprise two or more cable constriction mechanisms. For example, a plurality of cable constriction mechanisms may be positioned along a length of a stomach bag. By using a plurality of cable constriction mechanisms, the cable constriction mechanisms can be controlled such that the need for a propagation motion is reduced or eliminated entirely. Without the need for a propagation motion, each cable constriction mechanism of the plurality of cable constriction mechanisms may remain in a single location surrounding the stomach bag (i.e., each cable constriction mechanism may constrict to impart a peristaltic wave motion onto the stomach bag, but the mechanism does not propagate along a length of the stomach bag).

Figure 14:
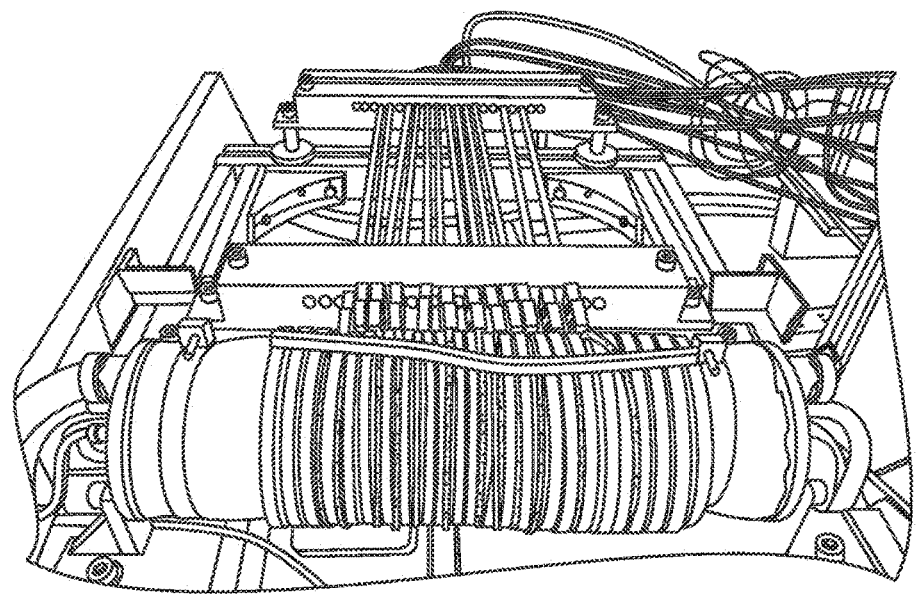
FIG. 14 shows an image of a simulated stomach having a plurality of cable constriction mechanisms; according to some embodiments.

FIG. 14 shows an image of a simulated stomach according to some embodiments. As shown in the figure, the stomach bag comprises twelve cable constriction mechanisms lined up side-by-side along a length of the stomach bag. In this example, the cable constriction mechanisms are positioned close to each other to create tightly-controlled constriction/peristaltic wave patterns on the stomach bag. When each of the cable constriction mechanisms are constricted, the hub and braided "lasso" sheath design allows the constricted sheath to remain concentric with the stomach bag as the sheath constricts. This tightly-stacked pattern can create tightly-controlled constriction patterns on the stomach bag. Additionally, it can allow independent control of the pyloric region of the stomach bag.

Figure 15:
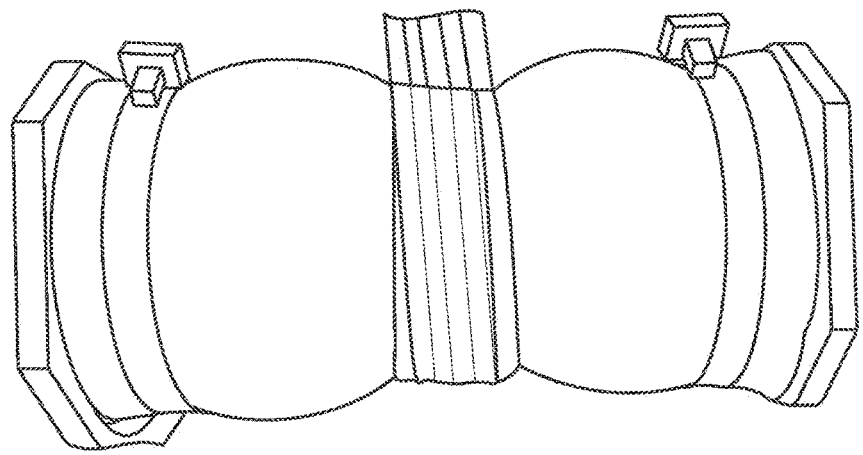
FIG. 15 shows an image of a simulated stomach comprising a plurality of cable constriction mechanisms bonded onto an exterior of the stomach bag, according to some embodiments.

As shown in FIG. 14, each cable constriction mechanism is positioned within a channel of the stomach bag. In some embodiments, a stomach bag may not take a i-shape, as described previously, but may instead represent a tube. For example, the stomach bag of FIG. 14 represents a tube shape. The exterior of the stomach bag comprises a plurality of channels to hold the multiple cable constriction mechanisms in place. Each cable constriction assembly can be actuated independently. In some embodiments, the "starting" or "resting" state of the braided "lasso" sheath (i.e., prior to peristaltic constriction) can be controlled to mimic different states of the stomach (e.g., fasted state or fed state). In some embodiments, stomach simulating devices using a cable constriction mechanism may be pressurized to 0.007 MPa to maintain concentricity of the stomach bag, FIG. 15 shows an image of a pressurized stomach comprising a plurality of cable constriction mechanisms. In some embodiments, once a cable constriction mechanism is in place, the sheathed cables may be coated in silicone to help improve the life of the system. This is shown in FIG. 15.

Figure 16:
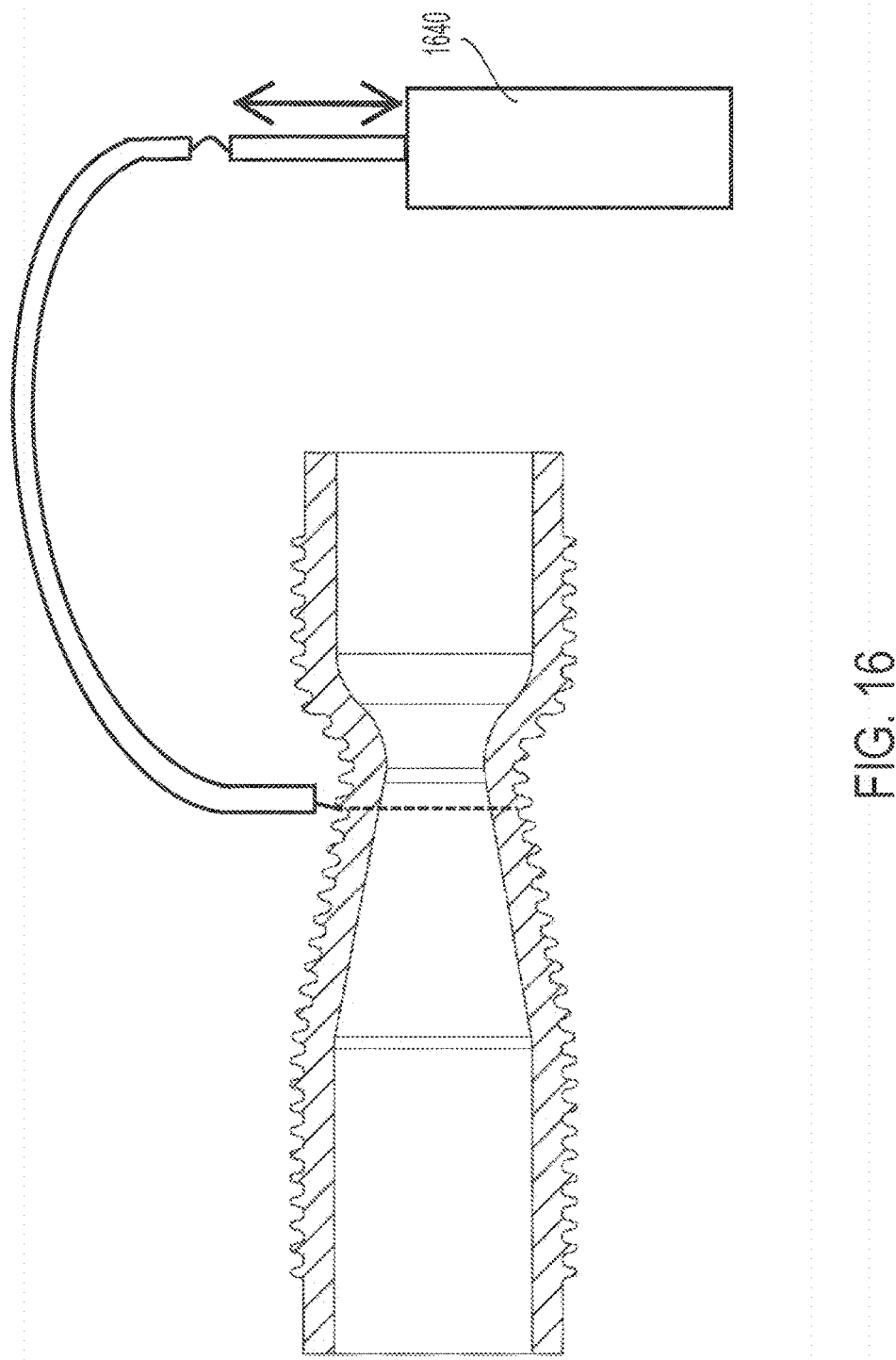
FIG. 16 shows a rope and spring mechanism to control a peristaltic mechanism, according to some embodiments.

In some embodiments, a rope and spring mechanism may be used to control a peristaltic mechanism. FIG. 16 shows a rope and spring mechanism that connects a control cable to a pneumatic actuator (piston) 1640. A rope or flexible member limits the distance between the wire and the pneumatic actuator to a maximum of half the length of the rope used to create the loop. The spring provides tension between the wire and the pneumatic actuator. If the wires are put in compression, the wire is able to kink and/or bend which reduces the lifetime of the wire. When the pneumatic actuator retracts, it reaches a maximum distance from the wire and the rope becomes taught. Further actuation of the pneumatic cylinder will pull the wire and constrict the stomach liner. When the pneumatic actuator extends forward, the rope loop is no longer under tension. The spring maintains tension on the wire. The result is that the wire is not put in compression at any point in the retract/extend cycle.

Example of Snake Constrictor

As described above, a snake mechanism may be used as a mechanical constrictor to simulate peristalsis. Preferably, the maximum bending stress at the minimum bend radius when the peristaltic wave is closest to the pylorus) does not cause plastic deformation in the elastic core of bearing snake 1126. Thus, a minimum bending radius of bearing snake 1126 can be determined and used to analyze various materials that may be used as the elastic core of the bearing snake 1126.

The minimum bending radius was assumed to be at a location of the stomach when the inner diameter of the stomach is 19 mm (i.e., the maximum opening of the pylorus). Using an estimated stomach bag thickness of 3.175 mm, the cross-sectional area of material could be found by:

$$A = \pi(R^2 - r^2)$$

If the stomach was fully constricted at this point, the cross-section would go from a hollow circle with a 3.175 mm thickness to a completely solid circle with the same area value found above. Solving for the radius of this solid circle yields the minimum bending radius ($\rho_{min}$) of the peristaltic mechanism:

$$\rho_{min} = \sqrt{\frac{A}{\pi}}$$

Using standard bending mechanics concepts, the height (h) necessary to achieve the minimum bending radius of 8.39 mm without plastic deformation was found to be dependent on the Young's Modulus (E) and Yield Stress ($\sigma_{max}$) of a given material:

$$h = \frac{2\rho_{min}\sigma_{max}}{E}$$

The maximum height value required to achieve a bend radius of 8.39 mm without permanent deformation was calculated for different materials by setting $\sigma_{allowable}$ to the $\sigma_{max}$ of that material. This data is provided in Table 3, below.

TABLE 3

Maximum height for specific materials

| Material | Young's Modulus (GPa) | Yield Stress (MPa) | $h_{max}$ (mm) |
|---|---|---|---|
| 1095 Spring Steel | 200 | 400 | 0.034 |
| 6061 Aluminum | 69 | 110 | 0.027 |
| Martensite Nitinol | 28 | 140 | 0.084 |
| Nylon | 2 | 90 | 0.756 |
| Polypropylene | 1.5 | 36 | 0.403 |

As shown in Table 3, plastic materials like nylon and polypropylene can yield larger height values than metal options. However, in some embodiments the elastic core can be stiff enough to support the weight of the radial bearings without sagging in the longitudinal direction. This may be better accomplished by some of the stiffer metal materials.

Figure 17:
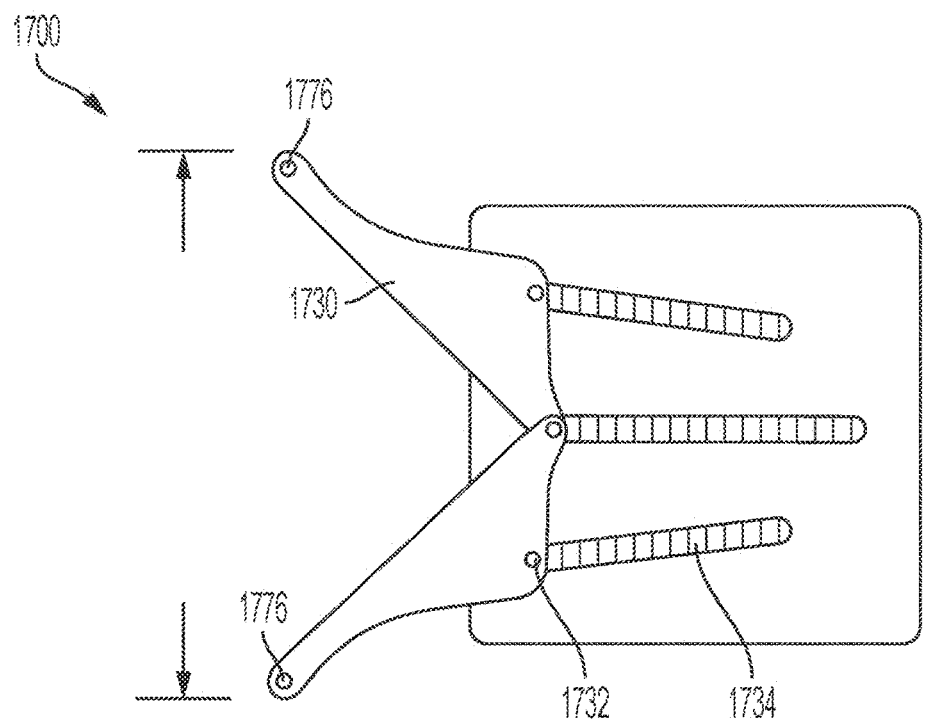
FIG. 17 shows a portion of a peristalsis mechanism, according to some embodiments.
Figure 18:
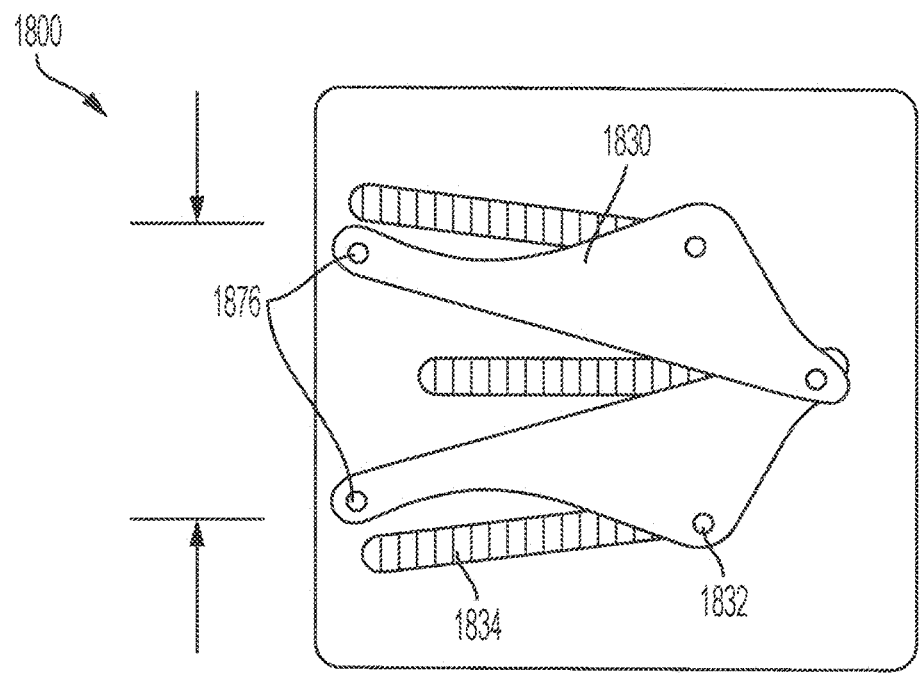
FIG. 18 shows a portion of a peristalsis mechanism, according to some embodiments.

Bearing snake mechanism 900 may use a linkage 930 to guide the bearing snake to open and close around a stomach bag. Linkage 930 can be configured to close at a rate that shrinks the radius of elastic core 926 while maintaining concentric constriction around the stomach bag. FIG. 17 shows a bearing snake actuator 1700 fully open, and FIG. 18 shows a bearing snake actuator 1800 fully closed. Bearing snake actuator 1700 and bearing snake actuator 1800 may be connected to a bearing snake frame at located 1776 and 1876, respectively.

Bearing snake actuator 1700 includes linkage 1730, one or more radial bearings 1732, and one or more tracks 1734. When bearing snake actuator 1700 is fully open, one or more radial bearings 1732 are located at a distal end of one or more tracks 1734. To close, linkage 1730 can cause one or more radial bearings 1732 to roll down a length of one or more tracks 1734.

Bearing snake actuator 1800 includes linkage 1830, one or more radial bearings 1832, and one or more tracks 1834. When bearing snake actuator 1800 is fully closed, one or more radial bearings 1832 are located at a proximal end of one or more tracks 1834. To open, linkage 1830 can cause one or more radial bearings 1832 to roll down a length of one or more tracks 1834.

Radial bearings 1732 of FIG. 17 and radial bearings 1832 of FIG. 18 are just one example of a mechanism that can reduce friction during opening and closing of the bearing snake. In some embodiments, a top plate and a bottom plate may be used to reduce friction even further. For example, a top plate and a bottom plate can mate surface to surface with the linkage.

Wave Propagation (i.e., Longitudinal Motion) of a Peristaltic Mechanism

Peristaltic mechanisms described herein can also mimic the wave propagation motion of peristalsis of a real stomach by moving down a length of the stomach bag to guide any contents of the stomach out through the pylon's. In some embodiments, a peristaltic mechanism can move longitudinally (i.e. from top to bottom) while following the center of the stomach.

As provided in Table 2, above, the velocity of propagation of a real stomach varies from 1.5 mm/s to 7.5 mm/s. In some embodiments, as many as three waves may occur per minute. Stomach simulating devices provided herein may include peristaltic mechanisms configured to move at various velocities and frequencies based upon the specific digestive state a user is replicating. Furthermore, some embodiments may include simulating a stomach under normal conditions or under accelerated conditions. In some embodiments, a peristaltic mechanism may have a velocity from 1.0-50.0 mm/s, from 2.0-30.0 mm/s, or from 3.0-20.0 mm/s. In some embodiments, a peristaltic mechanism may have a velocity less than 50.0 mm/s, less than 40.0 mm/s, less than 30.0 mm/s, less than 20.0 mm/s, less than 15 mm/s, less than 10.0 mm/s, less than 9.0 mm/s, less than 8.0 mm/s, less than 7.0 mm/s, less than 6.0 mm/s, less than 5.0 mm/s, or less than 4.0 mm/s. In some embodiments, a peristaltic mechanism may have a velocity more than 1.0 mm/s, more than 2.0 mm/s, more than 3.0 mm/s, more than 4.0 mm/s, more than 5.0 mm/s, more than 6.0 mm/s, more than 8.0 mm/s, more than 10.0 mm/s, more than 15.0 mm/s, more than 20 mm/s, more than 30.0 mm/s, or more than 40.0 mm/s. In some embodiments, a peristaltic mechanism may have a frequency from 1-5 peristaltic waves per minute, or from 2-4 peristaltic waves per minute. In some embodiments, a peristaltic mechanism may have a frequency of more than 1, more than 2, or more than 3 peristaltic waves per minute. In some embodiments, a peristaltic mechanism may have a frequency of less than 5, less than 4, less than 3, or less than 2 peristaltic waves per minute. Under accelerated conditions, a stomach bag may be subjected to 4-60 peristaltic waves per minute. In some embodiments, a stomach bag may be subjected to 6-45 or 12-36 peristaltic waves per minute. In some embodiments, a stomach bag may be subjected to less than 60, less than 51, less than 45, less than 36, less than 30, less than 24, less than 18, or less than 12 peristaltic waves per minute. In some embodiments, a stomach bag may be subjected to more than 4, more than 6, than 12, more than 18, more than 24, more than 30, more than 36, more than 45, or more than 51 peristaltic waves per minute.

Additionally, in a real stomach, a peristaltic wave typically doesn't reach the maximum diameter the corpus. Accordingly, some embodiments of a peristaltic mechanism can mimic this by applying pressure predominantly to the mitral region of a stomach bag. However, the range of motion of a peristaltic wave may vary based upon the overall size of the stomach bag and the digestive phases a user is modelling. In some embodiments, a peristaltic mechanism can start from 80-250 mm, from 100-200 mm, or from 125-175 mm above the pylorus and move downwards. In some embodiments, a peristaltic mechanism can start more than 80 mm, more than 100 mm, more than 120 mm, more than 140 mm, more than 160 mm, more than 180 mm, more than 200 mm, or more than 225 mm above the pylorus and move downwards. In some embodiments, a peristaltic mechanism can start less than 250 mm, less than 225 mm, less than 200 mm, less than 180 mm, less than 160 mm, less than 140 mm, less than 120 mm, or less than 100 mm above the pylorus and move downwards.

Figure 19:
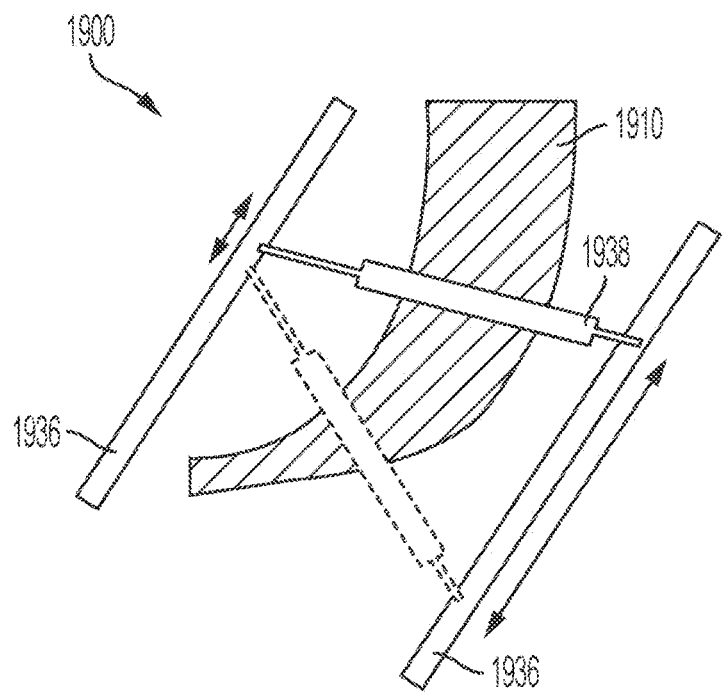
FIG. 19 shows a propagation method for the peristalsis mechanism, according to some embodiments.
Figure 20:
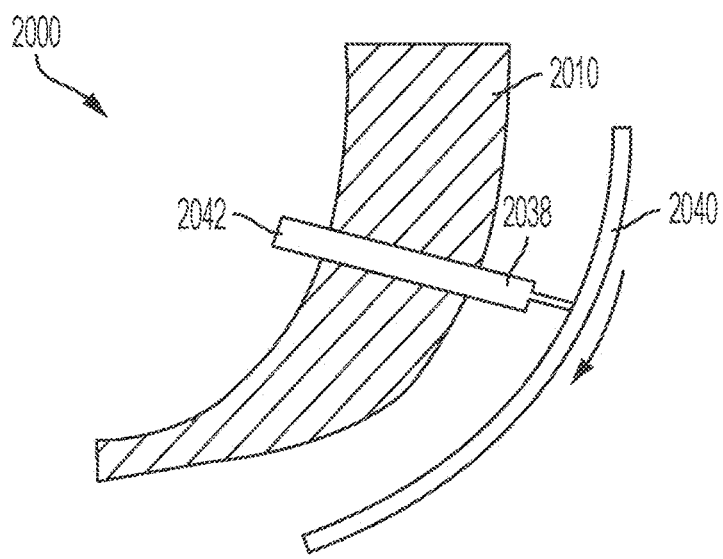
FIG. 20 shows a propagation method for the peristalsis mechanism, according to some embodiments.
Figure 21:
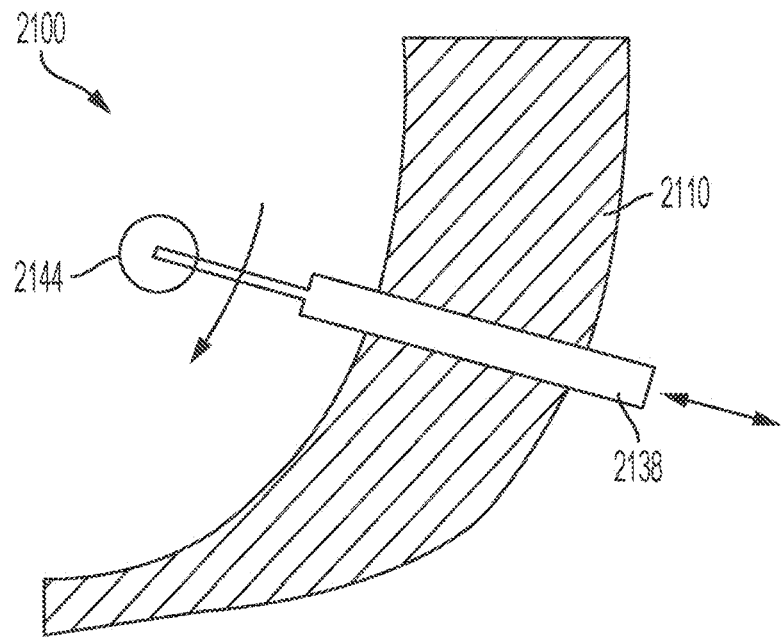
FIG. 21 shows a propagation method for the peristalsis mechanism, according to some embodiments.

FIGS. 19-21 provide examples of various mechanisms designed to move the peristaltic mechanism down a length of the stomach bag while following a center axis of the bag. Specifically, these devices include a dual linear track mechanism, a curved track mechanism, and a fixed motor mechanism. Each device is discussed in detail below.

FIG. 19 shows dual linear track mechanism 1900 according to some embodiments. Dual linear track mechanism 1900 includes two linear tracks, peristaltic actuator 1938 (e.g., any of the peristaltic wave mechanisms provided in FIGS. 8-16), and stomach bag 1910. In particular, dual linear track mechanism 1800 includes suspending peristaltic actuator 1938 between two linear tracks 1936. Each linear track 1936 can be actuated at a different rate to allow peristaltic actuator 1938 to follow the are of the stomach.

FIG. 20 shows curved track mechanism 2000 according to some embodiments. Curved track mechanism 2000 includes curved track 2040, peristaltic actuator 2038 (e.g., any of the peristaltic wave mechanisms provided in FIGS. 8-16), and stomach bag 2010. A first end of peristaltic actuator 2038 may be configured to move along curved track 2040, and a second end 2042 of peristaltic actuator 2038 may be configured to remain stationary, such that peristaltic actuator 2038 pivots at a location of second end 2042.

FIG. 21 shows fixed motor mechanism 2100 according to some embodiments. Fixed motor mechanism 2100 includes motor 2144, peristaltic actuator 2138 (e.g., any of the peristaltic wave mechanisms provided in FIGS. 8-16), and stomach bag 2110. Like curved track mechanism 1900 of FIG. 19, fixed motor mechanism 2100 of FIG. 21 is configured to move peristaltic actuator 2038 up and down stomach bag 2110 by pivoting peristaltic actuator 2038 about a fixed point. As shown in FIG. 21, the fixed point is motor 2144. In some embodiments, motor 2144 may be configured to move peristaltic actuator 2138 radially (to follow to arc of stomach bag 2110). In some embodiments, motor 2144 may also be configured to telescope, or move peristaltic actuator 2138 inwards and outwards with respect to motor 2144.

Pylorus Mechanism

Following is a description of various pylorus mechanisms (i.e., valves) that can simulate one or more features of the pylorus of a real stomach. The pylorus of a real stomach operates as a selective valve filtering stomach contents out of the antrum and into the duodenum based on particle size. Further, the pylorus can achieve various rates of constriction based upon the digestive state of the stomach. Accordingly, pylorus mechanisms provided herein can mimic the function of the pylorus by dynamically adjusting the diameter of the pyloric region according to various digestive phases.

FIGS. 22-26 provide various types of valves that may be used to mimic the pylorus of a real stomach by applying circumferential constriction and having the ability to modulate constriction from fully open to fully closed. Specifically, these devices include an iris flow valve, a pneumatic donut, a pneumatic donut figure-eight, bilateral hooks, and interlocking teeth. Each device is discussed in detail below.

Figure 22:
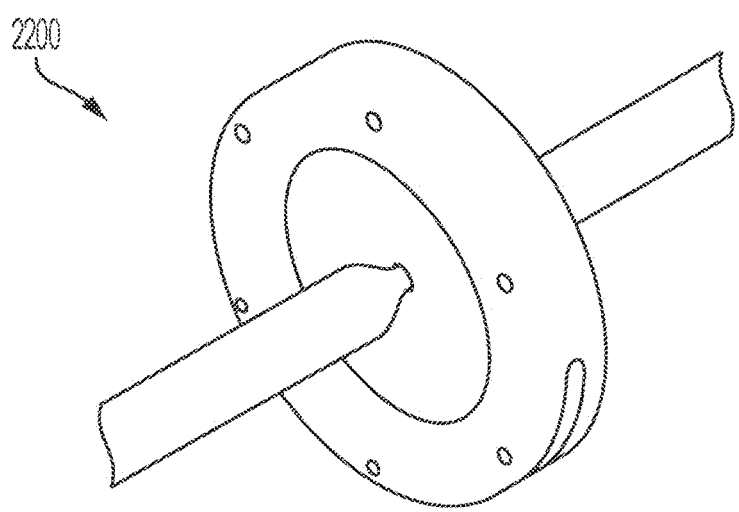
FIG. 22 shows a pylorus mechanism, according to some embodiments.

FIG. 22 shows iris flow valve 2200 according to some embodiments. Iris flow valve 2200 offers annular contraction with the option of integrated motorized control of the aperture diameter. An example of a commercially-available iris flow valve is the Syntron FV-4 iris flow valve. However, other types of iris flow valves may reasonably be incorporated as well, including modified iris designs.

Iris flow valves, such as iris flow valve 2200 of FIG. 22, are typically used in the control of dry powder flow. In particular, they are designed to constrict an opening in an annular fashion while being strong enough to support the weight of the powder above the valve. In some embodiments, iris flow valve 2200 can provide a diameter ranging from 101.2 mm when totally open to 0 mm when closed. Thus, iris flow valve 2100 may satisfy the diametrical requirement of a simulating stomach device anatomically representative of a human stomach. In some embodiments, iris flow valve 2200 may include a rod end coupling, allowing for a linear actuator to move the valve through the required arc of the stomach bag to dynamically control the pylorus diameter. Due to the thickness of the bars encased by the nylon sheath, iris flow valve 2100 may minimize the risk of cutting the stomach bag.

In some embodiments, the size, shape, and material of a stomach bag may require iris flow valve 2200 to provide from 8-15 pound-force for full constriction at the pylorus. In some embodiments, a stomach bag may require less than 15, less than 13, or less than 10 pound-force to achieve full constriction. In some embodiments, a stomach bag may require more than 8, more than 10, more than 12, or more than 13 pound-force to achieve full constriction.

An actuator configured to operate and control iris flow valve 2200 may be able to control iris flow valve 2200 to achieve the above parameters. In addition, an actuator for iris flow valve 2200 may also include positional feedback in the form of a potentiometer, a hall effect sensor, and/or an optical encoder. In some embodiments, a Firgelli Automations OS Series linear actuator may be used to control iris flow valve 2200.

Figure 23:
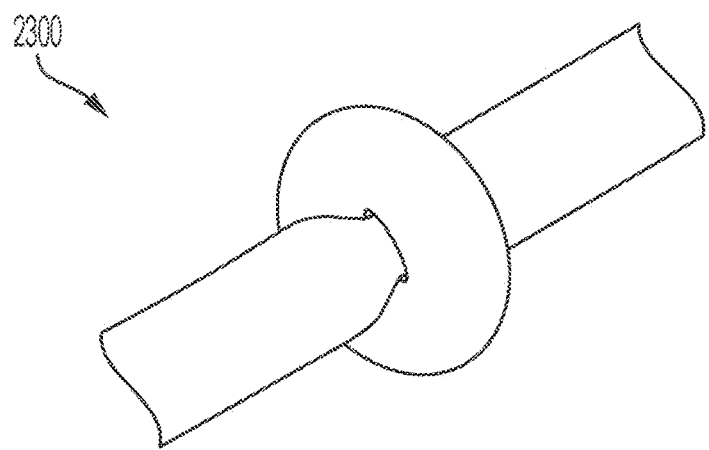
FIG. 23 shows a pylorus mechanism, according to some embodiments.

FIG. 23 shows pneumatic donut mechanism 2300 according to some embodiments. Like pneumatic donut mechanism 900 of FIG. 9, pneumatic donut mechanism 2300 may be configured to constrict around stomach bag 2310. However, by constricting around the pylorus of the stomach bag, pneumatic donut may be configured to mimic the pylorus mechanism, instead of the peristaltic wave motion of donut mechanism 900.

Figure 24:
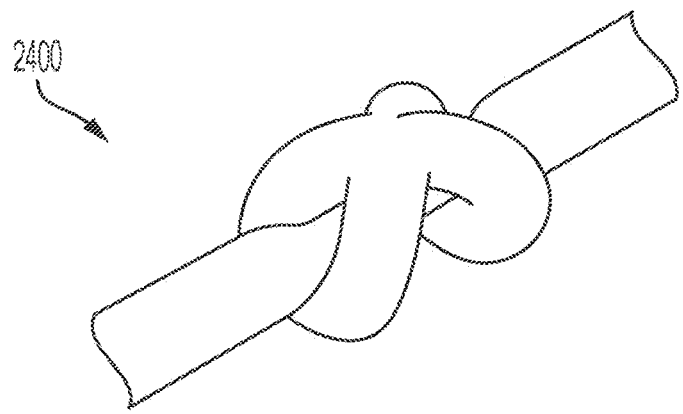
FIG. 24 shows a pylorus mechanism, according to some embodiments.

FIG. 24 shows pneumatic donut figure-eight mechanism 2400 according to some embodiments. Like pneumatic donut mechanism 2300 of FIG. 23, pneumatic donut figure-eight mechanism 2400 may be configured to constrict around stomach bag 2410 to mimic the pylorus mechanism.

Figure 25:
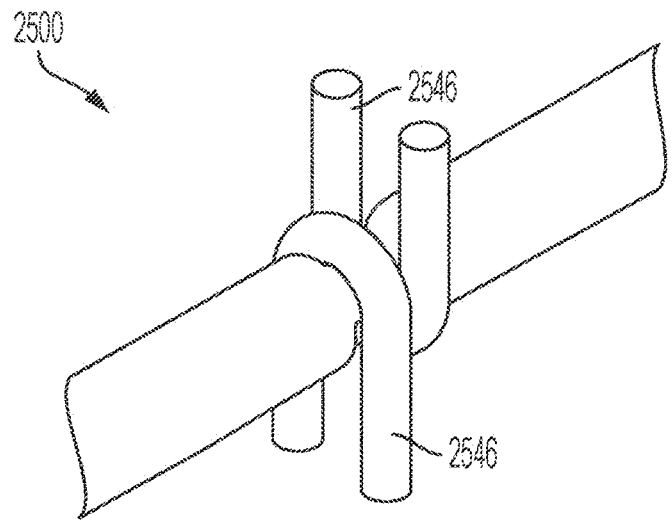
FIG. 25 shows a pylorus mechanism, according to some embodiments.

FIG. 25 shows bilateral hooks mechanism 2500 according to some embodiments. In this design, at least two hooks 2546 can be actuated simultaneously to constrict the pylon's, thereby simulating annular constriction. For a simplified actuation scheme, each hook 2546 could be attached to an independent actuator linked to the same control loop. Alternatively, a rack and pinion system could be employed to actuate both hooks with one motor.

Figure 26:
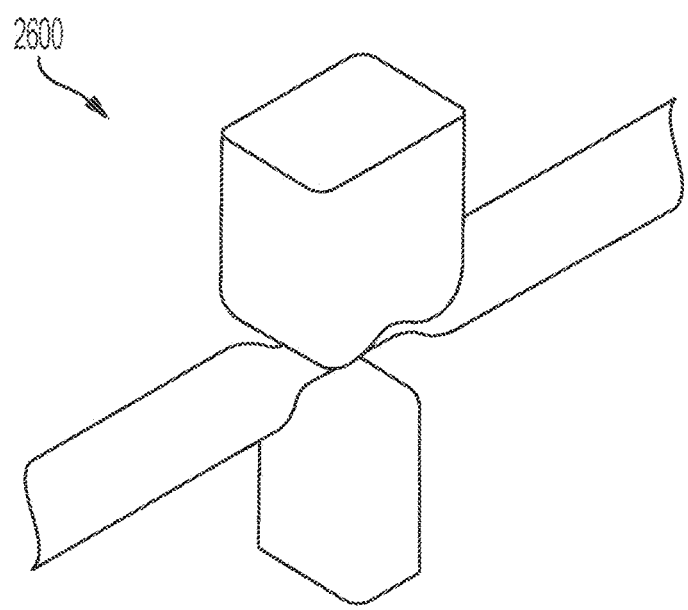
FIG. 26 shows a pylorus mechanism, according to some embodiments.

FIG. 26 shows interlocking teeth mechanism 2600 according to some embodiments. Interlocking teeth mechanism 2600 comprises two "teeth" that engage when pressed together. When engaged, the two "teeth" may constrict the pylorus of a stomach hag.

Fluid System Design

Following is a description of various embodiments of a fluid design system that can be used to simulate the fluid flow of a real stomach. In some embodiments, fluid leaving the stomach simulating device can be recirculated to the top of the stomach bag to form a closed-circuit fluid system.

Figure 27:
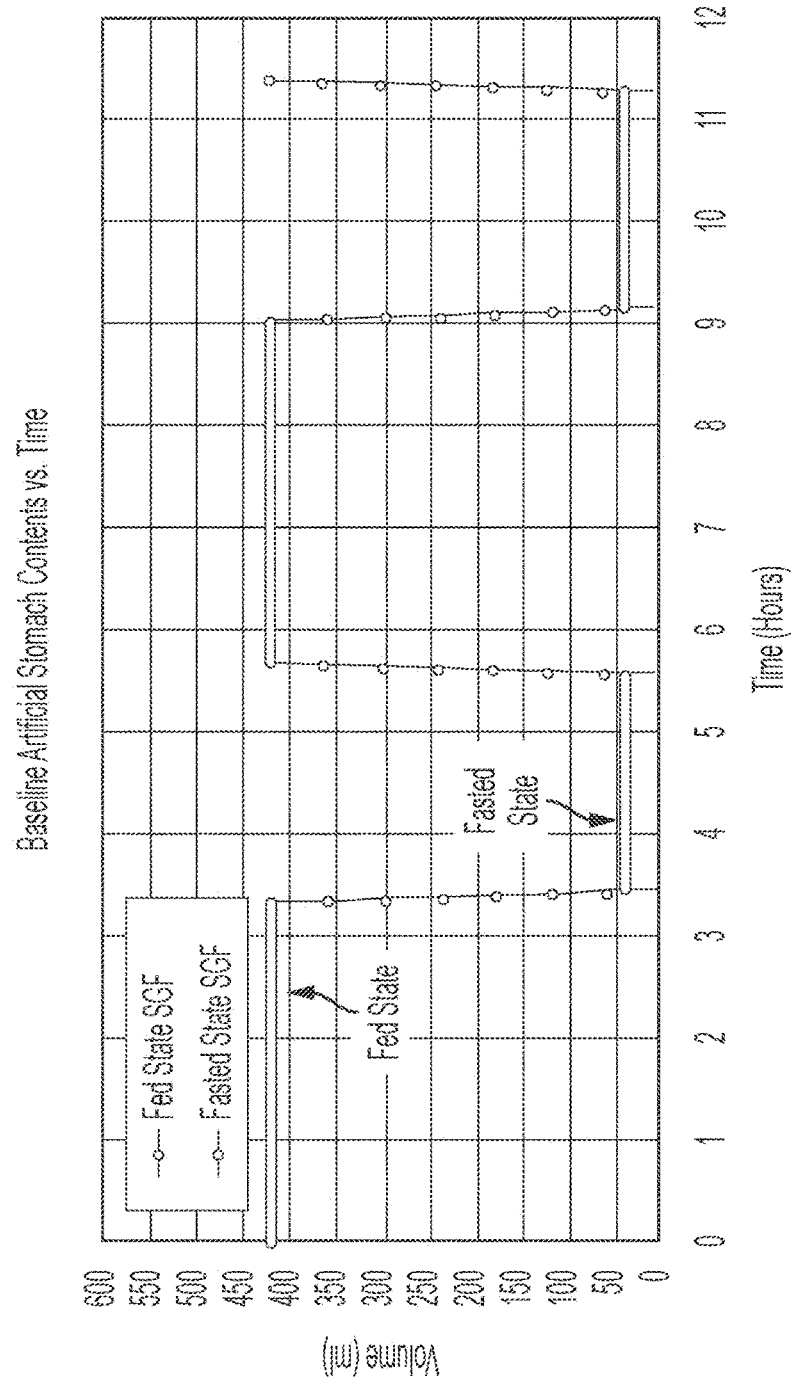
FIG. 27 shows a baseline of stomach contents over time, according to some embodiments.
Figure 28A:
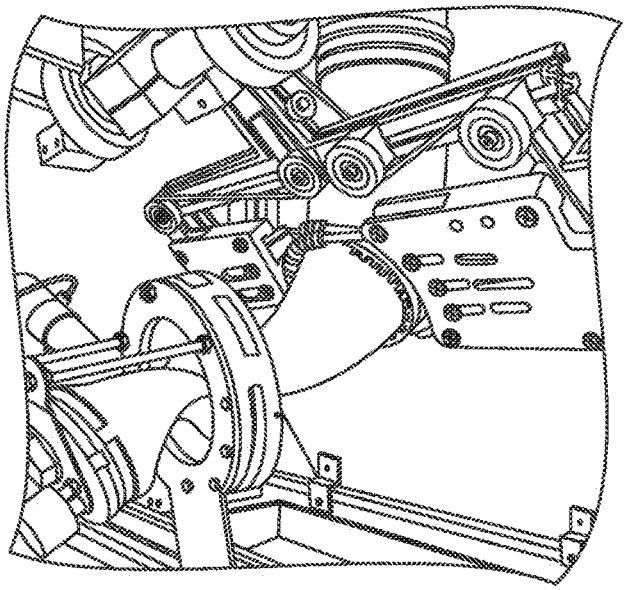
FIGS. 28A and 28B show images of a stomach bag mimicking a fed state fluid level and a fasted state fluid level, respectively, according to some embodiments.
Figure 28B:
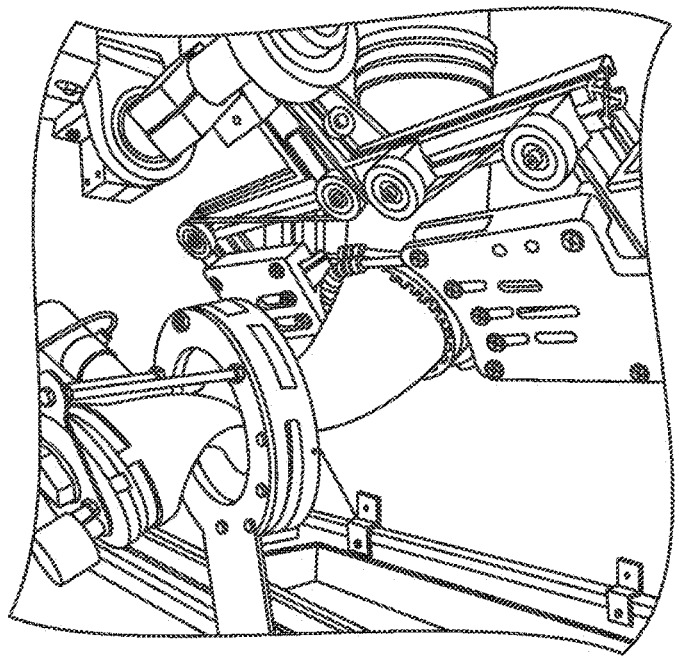

Generally, the fluid system of a stomach simulator provided herein is designed to exchange fluids between fed and fasted state media. To accomplish this, fluid systems provided herein can be designed to vary the volume of fluid in the stomach bag to mimic psychological volumes during different contraction cycles. For example, FIGS. 27, 28A, and 28B show how a fluid system can mimic the fed and fasted states of a real stomach. Specifically, FIG. 27 shows the baseline stomach contents over time for a simulated stomach provided herein. As indicated on the Figure, the fed state corresponds to a relatively high fluid volume and the fasted state corresponds to a relatively low fluid volume. FIG. 28A is a stomach simulating device that corresponds to the fed state fluid level (i.e., a relatively high fluid level), and FIG. 28B is a stomach simulating device that corresponds to the fasted state fluid level (i.e., relatively low fluid level).

In some embodiments, a fluid system for a stomach simulating device includes two fluid sub-systems. In some embodiments, one fluid sub-system includes stomach cavity fluid interfaces, or "bulkheads." In some embodiments, the bulkheads may be cylindrical plastic parts that act as caps at the top and bottom of the stomach bag to seal fluid and any solid contents inside a stomach bag. In some embodiments, a mechanical seal is accomplished by tightening zip ties or other circumferential fasteners around a circumference of a bulkhead to fasten an opening of a stomach bag to the bulkhead.

In some embodiments, a top bulkhead configured to connect to a top of a stomach bag (opposite the pylorus) may include a port for stomach cavity access. For example, a port may be used to insert dosage forms and test stomach fluid composition. In some embodiments, the bulkheads may comprise a material such as polyvinyl chloride (PVC), which is characterized by chemical resistance, cost, and ease of machinability. Other suitable materials may include acrylonitrile butadiene styrene, acrylic, high density polyethylene, nylon, polyether ether ketone, polyethylene terephthalate, polycarbonate, polypropylene, polysulfone, polyphenylene sulfide, polychlorinated dibenzofurans, and/or polytetrafluoroethylene.

In some embodiments, a bottom bulkhead configured to connect to a bottom of a stomach bag (proximate to the pylorus) may include a strainer to ensure that no particulate enters the delicate tubing or pumps used in the recirculation system. The bulkhead can also include a port to access any broken dosage forms and/or debris.

Both a top and a bottom bulkhead can be secured in space inside the enclosure. Not only do the bulkheads serve to complete the fluid seal around the ends of the bag, but they can also dictate the location of the center axis of the stomach bag.

Controlling the fluid inflow and outflow of the stomach environment is also a key component of the stomach simulating device. To facilitate the recirculation of fluid through the stomach, pumps can be used to move the fluid and tubes can be used to direct the fluid in the fluid system. Typically, dosage forms are tested using fed state simulated gastric fluid and fasted state simulated gastric fluid. In some embodiments, the fluid system design is configured for automatic volume control of two or more different types of fluids to meet these testing criteria.

In some embodiments, the fluid system includes four peristaltic dosing pumps and two fluid reservoirs. In some embodiments, each fluid reservoir has one pump for draining and one pump for filling the stomach. This configuration can minimize any risk of cross contamination between the fed and fasted state simulated gastric fluids. In some embodiments, check valves may be used for added precaution upstream of the drain pumps and downstream of the fill pumps to isolate the lines from each other.

In some embodiments, fluids such as bile can also be simulated. For example, a fluid system may include a bile injection mechanism to simulate bile reflux from the duodenum. Other enzymes and/or compounds produced by a real stomach such as pepsin, gastric lipase, hydrochloric acid, intrinsic factor, mucin, gastrin, and other gastrointestinal tract fluids may be simulated as part of a fluid system as well.

In some embodiments, a peristaltic pump such as the Jebao DP-4 chemical dosing pump may be used to pump fluid through the stomach simulating device. In particular, the Jebao DP-4 chemical dosing pump includes four individually controlled peristaltic pumps, each rated for 60 ml/min of flow at a high accuracy. An on-board programming interface lets the user adjust cycle times and fluid volumes. However, other peristaltic pumps may be suitable as well.

Enclosure Design

Following is a description of various embodiments of enclosures that can be used to combine the various component parts discussed above into an operable stomach simulating device. An enclosure design includes two main features: (1) the mechanical enclosure; and (2) the environmental control, each of which are discussed in turn below.

Mechanical Enclosure

In some embodiments, a mechanical enclosure can house structural support members, mounting locations, electrical, and fluid equipment that may be used to operate the stomach simulating device. With a mechanical enclosure, kinematic studies can be performed in the functional environment rather than benchtop fixtures.

FIG. 29A shows a perspective view of a mechanical enclosure 2900 comprising stomach bag 2910, peristaltic mechanism 2938, and pyloric mechanism 2980. FIG. 29B shows a front view of a mechanical enclosure 2900 comprising stomach hag 2910, peristaltic mechanism 2938, and pyloric mechanism 2980. In some embodiments, mechanical enclosure 2900 may include a partition that can serve as a barrier between an area 2984 comprising stomach bag 2910, peristaltic mechanism 2938, and pyloric mechanism 2980, and the electronic control hardware in "electronics bay" 2982. Mechanical enclosure 2900 can also contain any spills that may occur from escaping to the lab or leaking into electronics bay 2982. For example, one or more acrylic panels may be placed between structural members to contain any spills.

Figure 30:
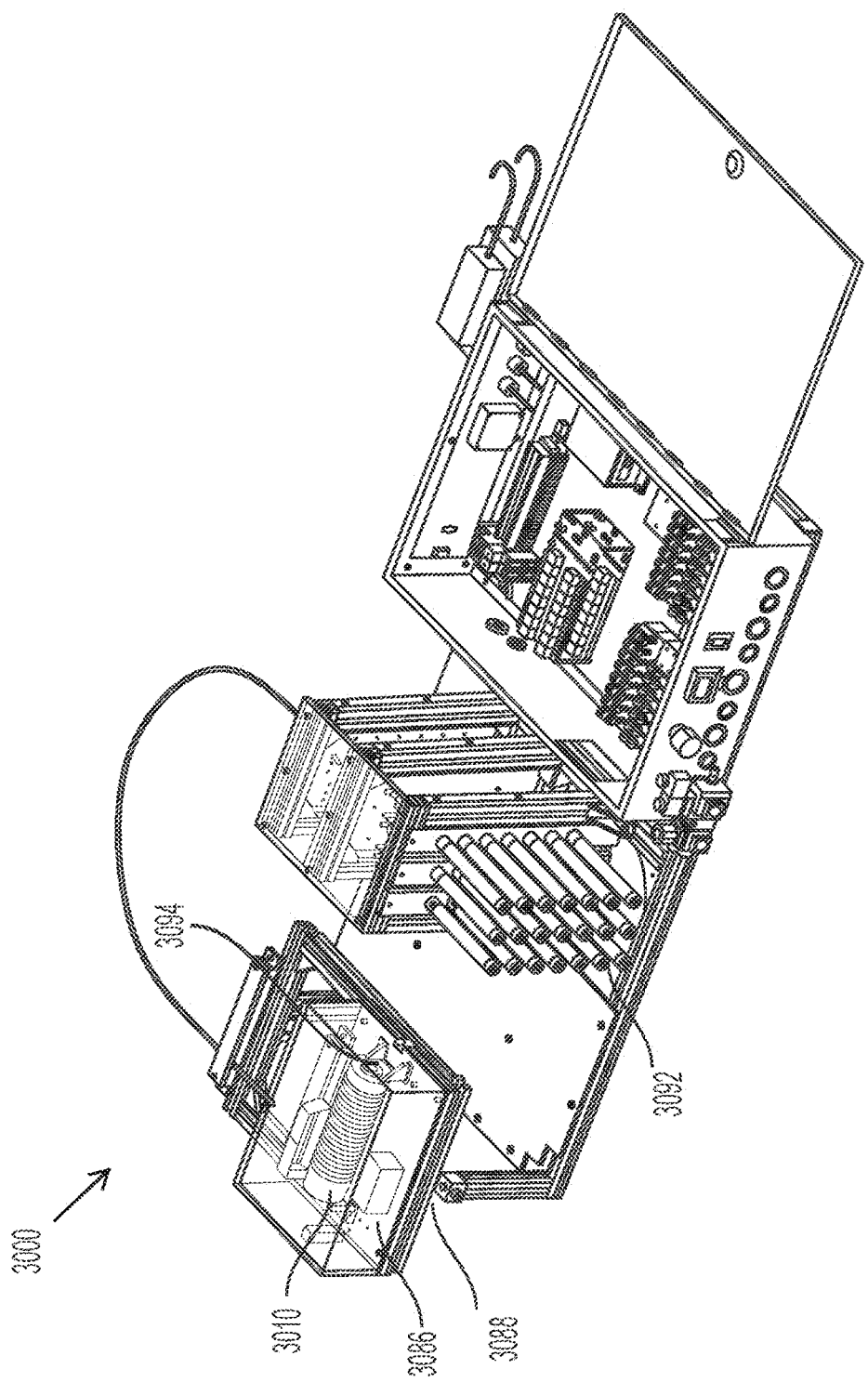
FIG. 30 shows a stomach simulated device, according to some embodiments.

FIG. 30 shows an example enclosure design according to some embodiments. As shown, enclosure design 3000 includes stomach bag 3010, at least one camera 3084, heating/environmental system 3086, pivot 3088, fluid system 3090, and cable control system 3092.

Camera 3084 can be installed along the stomach bag axis to observe behavior of items in the stomach bag. In some embodiments, a camera can be installed at each opening of the stomach bag to observe behavior in both the antrum and the duodenum regions.

Heating/environmental system 3090 can be used to keep the stomach bag at body temperature. Heating/environmental system 3090 may include any of the features described in detail below with respect to environmental control systems.

Pivot 3086 can allow the entire stomach bag assembly to rotate from a horizontal to a vertical position, allowing the system to mimic prone and upright stomach orientations.

Fluid system 3088 can include both fluid (e.g., simulated gastric fluid) and lubricant. In some embodiments, the fluid and lubricant can be passed through the camera 2984 bulkheads and into the stomach bag.

Cable control system 3090 comprises pneumatic cylinders are used for actuation to provide elasticity to the cables of a cable constriction mechanism that may be used for a peristaltic mechanism of the stomach simulator.

Figure 31:
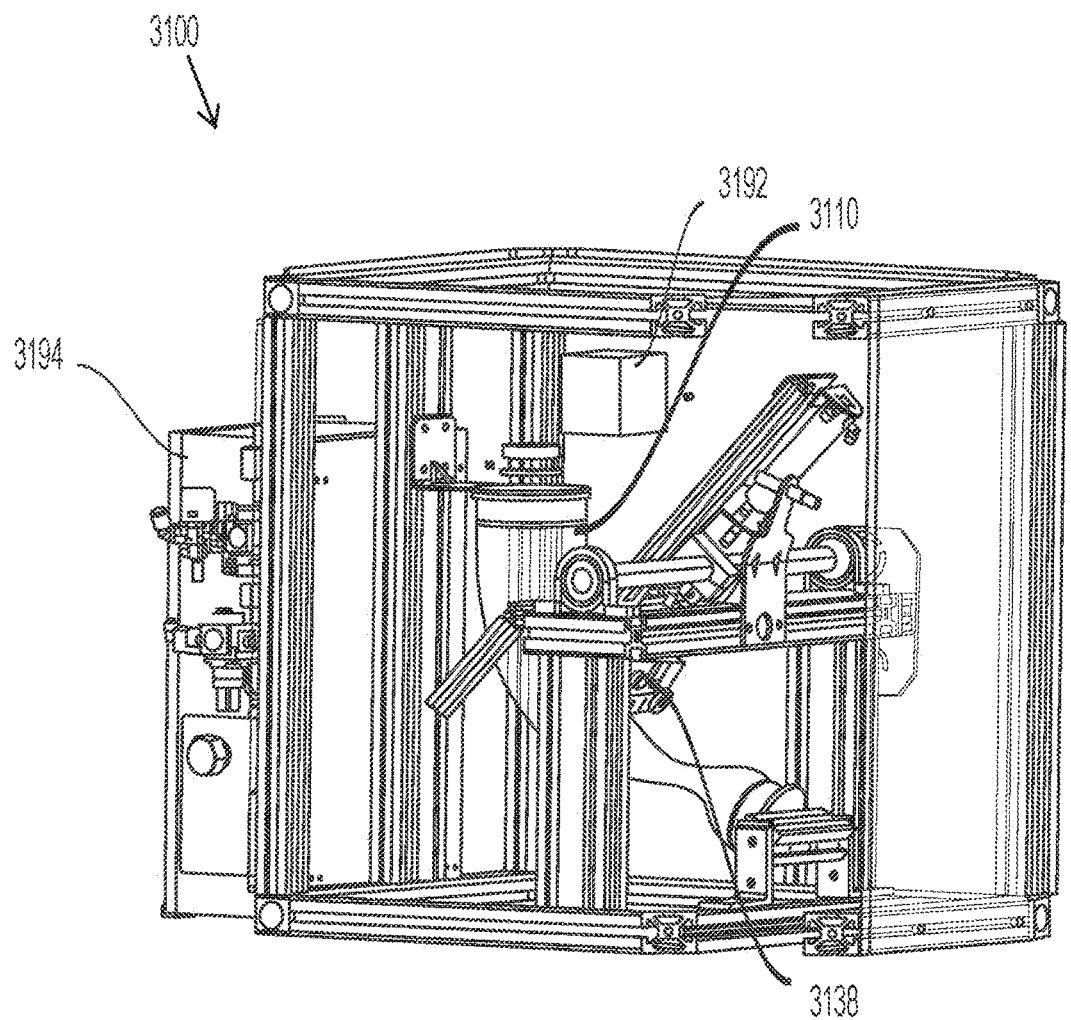
FIG. 31 shows a stomach simulated device, according to some embodiments.

FIG. 31 shows an enclosure design 3100 comprising a stomach bag 3110, peristaltic mechanism 3138, heating system 3192, and control system 3194. Heating system 3192 and control system 3194 are described in more detail below.

Control Systems

In some embodiments, an enclosure design may include a control system. A control system may be configured to control the pyloric mechanism, the peristaltic mechanism, the fluid flow, the heating system of a stomach simulator, and/or the pressure of the inside volume of the stomach liner. In some embodiments, a control system can include video recording of the interior and exterior of the of the stomach bag. In some embodiments, a control system can utilize a video recording and/or a machine vision technique to identify a dosage form passage, for example. A dosage form passage could trigger desirable behaviors such as cunning a video of tests, notifying operators, and/or automatically stopping or restarting a test. Other possible systems may automatically insert a dosage form into the stomach bag, reorient the dosage form position inside the stomach bag, and/or automatically rotate the stomach bag orientation.

In some embodiments, an enclosure design may include an environmental control system (e.g., a heating system) to simulate the environment (e.g., temperature) of a real stomach. In order to most accurately represent an in vivo environment, the temperature of an in vitro stomach simulating device can be controlled such that chemical reactions occur at an accurate rate. In some embodiments, an environmental control system may include two components. The first part of the system can control the temperature of the simulated gastric fluids in the reservoirs, while the second part can control the temperature in the stomach section of the enclosure.

By controlling both the process fluid temperature as well as the temperature of the components and surroundings of the stomach, a constant temperature can be achieved within a stomach bag. However, in some embodiments, an environmental control system may only include one of the two component parts described.

To control the temperature of the fluid reservoirs, indirect heat may be used to prevent burning of the simulated gastric fluid. Indirect heat can be accomplished with the use of a constant temperature water bath. Water may be kept at a constant temperature in the bath using a sous vide circulation heater (commonly used to slow cook foods). In some embodiments, an on-board thermocouple and temperature control system may be included to make the environmental control system a "set and forget" system (i.e., where the user sets the desired fluid temperature and the system maintains a constant bath temperature without user intervention). For example, such a system can heat simulated gastric fluids in at least two reservoirs from ambient temperature to 98.6° F. in less than 15 minutes, with temperature stability on the order of ±0.1° F.

In some embodiments, indirect heat may be applied to the simulated gastric fluid using heated air. For example, heater 3192 may be a convective heater wired to a PID temperature controller. The temperature controller can take readings from a thermocouple to determine if the heater should be on or off. The heater has a fan and heating element which circulates air throughout the enclosure to bring the entire environment, including bulkheads and stomach liner, to body temperature.

As the fluid is pumped from the warm reservoirs to the stomach, there may be a quantifiable heat loss through the tubing and bag if the surrounding environment is not kept at the fluid temperature. Therefore, the air inside of the stomach section of the enclosure may be kept at 98.6° F. to maintain the proper stomach temperature. In some embodiments, a heat gun can be used as a prime air heater inside the assembly. For example, a heat gun can heat the enclosure volume from ambient temperature to 98.6° F. in 10 minutes with a maximum temperature of 115° F.

Methods of Simulating a Stomach

Following is a discussion of embodiments of methods of simulating a stomach that can include any or all features of a stomach simulating device described above. For example, methods of simulating a stomach can include using an anatomically representative stomach bag, a mechanical constrictor to apply peristaltic forces to the bag, and/or a valve to simulate the pylorus of a real stomach. In particular, methods for simulating a stomach may include inserting a dosage form into a stomach bag and observing how the dosage form reacts within the stomach bag. For example, methods may include observing how a mechanical constrictor and/or a valve affect the dosage form in the stomach bag. In some embodiments, methods of simulating a stomach can include retaining the dosage form in the stomach bag for a plurality of simulated digestive cycles.

Figure 32:
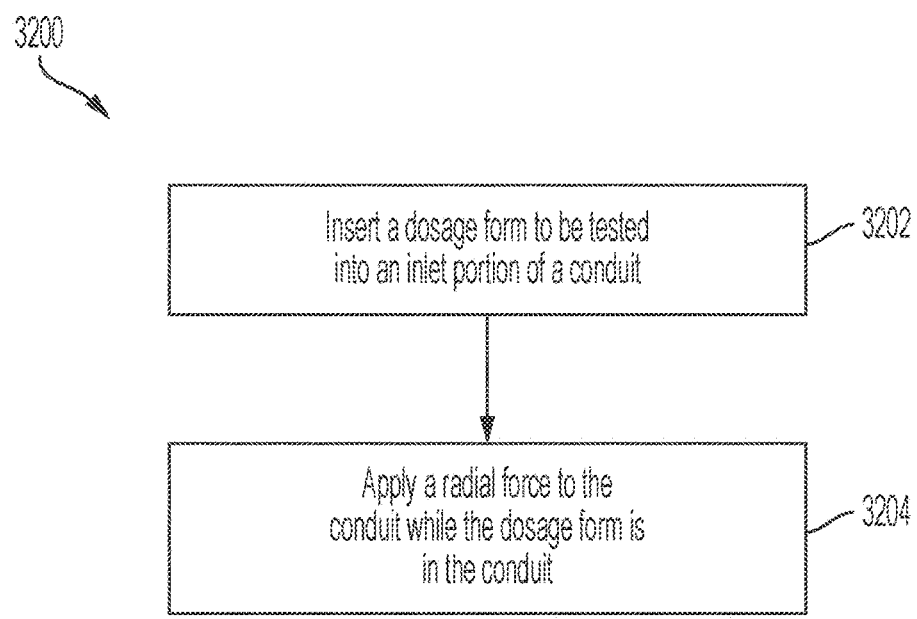
FIG. 32 is a method of simulating a stomach, according to some embodiments.

FIG. 32 provides a method for simulating a stomach according to some embodiments. Step 3202 includes inserting a dosage form into a stomach bag. The dosage form may include a chemical composition, an API, a food product, and/or a foreign object (i.e., not designed to enter a real stomach). In some embodiments, the dosage form may include a container configured to carry an API, such as a capsule or other shell of a pharmaceutical composition.

In some embodiments, the dosage form may be a gastroretentive dosage form. Gastroretentive dosage forms are delivery systems for therapeutic agents which remain in the stomach for days to weeks, or even over longer periods, during which time drugs or other agents can elute from the systems for absorption in the gastrointestinal tract. Gastroretentive dosage forms are designed to be administered to the stomach of a patient, typically in a capsule which is swallowed or introduced into the stomach by an alternate method of administration (for example, feeding tube or gastric tube). Upon dissolution of the capsule in the stomach, the systems expand or unfold to a size which remains in the stomach and resists passage through the pylorus over the desired residence period (such as three days, seven days, two weeks, etc.).

Step 3204 includes applying a radial force to the conduit while the dosage form is in the conduit. In some embodiments, this may include simulating a stomach under normal conditions or under accelerated conditions. For example, a real stomach may be subjected to three peristaltic waves per minute. Under accelerated conditions, a stomach bag may be subjected to 4-60 peristaltic waves per minute. In some embodiments, a stomach bag may be subjected to 6-45 or 12-36 peristaltic waves per minute. In some embodiments, a stomach bag may be subjected to less than 60, less than 51, less than 45, less than 36, less than 30, less than 24, less than 18, or less than 12 peristaltic waves per minute. In some embodiments, a stomach bag may be subjected to more than 4, more than 6, more than 12, more than 18, more than 24, more than 30, more than 36, more than 45, or more than 51 peristaltic waves per minute.

Some methods of simulating a stomach may include determining a residence time of the dosage form. The residence time of the gastroretentive dosage form is defined as the time between administration of the gastroretentive dosage form to the stomach bag and exit of the gastroretentive dosage form from the stomach bag of a stomach simulating device simulating a real stomach. Under accelerated conditions, the residence time may be calculated by taking into account an acceleration factor (i.e., the extent at which the stomach simulating device is operating faster than a real stomach). In addition to gastroretentive dosage forms described above, some pharmaceutical compositions, food products, and foreign objects may also need multiple digestive cycles to take place before they, have broken into pieces small enough to pass through the pylorus.

Accordingly, in some embodiments, the residence time of a dosage form may be from 1 hour to 4 weeks, from 6 hours to 2 weeks, from 12 hours to 1 week, or from 18 hours to 36 hours. In some embodiments, the residence time of a dosage form may be more than 1 hour, more than 3 hours, more than 4 hours, more than 5 hours, more than 6 hours, more than 8 hours, more than 10 hours, more than 12 hours, more than 15 hours, more than 18 hours, more than 1 day, more than 1.5 days, more than 2 days more than 2.5 days, more than 3 days, more than 3.5 days, more than 4 days, more than 5 days, more than 6 days, more than 1 week, more than 1.5 weeks, more than 2 weeks, more than 2.5 weeks, or more than 3 weeks. In some embodiments, the residence time of a dosage form may be less than 4 weeks, less than 3.5 weeks, less than 3 weeks, less than 2.5 weeks, less than 2 weeks, less than 1.5 weeks, less than 1 week less than 6 days, less than 5 days, less than 4 days, less than 3 days, or less than 2 days.

Exemplary Embodiments

The invention is further described by the following embodiments. The features of each of the embodiments are combinable with any of the other embodiments where appropriate and practical.

Embodiment 1. A stomach simulating device comprising: a conduit having a body portion, a first diameter at an inlet portion, and a second diameter at an outlet portion, wherein the first diameter at the inlet portion is greater than the second diameter at the outlet portion, the body portion is located between the inlet portion and the outlet portion, and at least a portion of the conduit is curved in a direction from the inlet portion the outlet portion; a mechanical constrictor configured to constrict at least a portion of the body portion of the conduit, and a valve configured to at least partially close a portion of the conduit closer to the outlet portion than the inlet portion of the conduit.

Embodiment 2. The stomach simulating; device of embodiment 1, wherein the conduit comprises a J-shape.

Embodiment 3. The stomach simulating device of embodiment 1 or 2, wherein the conduit comprises silicone.

Embodiment 4. The stomach simulating device of any of embodiments 1-3, wherein a top opening of the conduit comprises a diameter of 3.0-8.0 inches.

Embodiment 5. The stomach simulating device of any of embodiments 1-4, wherein the conduit comprises a minimum diameter in an unconstricted conduit of 0.25-2.0 inches.

Embodiment 6. The stomach simulating device of any of embodiments 1-5, wherein the conduit comprises a wall thickness of 1-15 mm.

Embodiment 7. The stomach simulating device of any of embodiments 1-6, wherein a diameter of the conduit continuously decreases in a direction from the inlet portion to the outlet portion.

Embodiment 8. The stomach simulating device of any of embodiments 1-7, wherein the inlet portion of the conduit comprises a constant diameter from a first location to a second location of the conduit.

Embodiment 9. The stomach simulating device of any of embodiments 1-8, wherein the outlet portion of the conduit comprises a constant diameter from a third location to a fourth location of the conduit.

Embodiment 10. The stomach simulating device of any of embodiments 1-9, wherein the conduit comprises a first plurality of ribs along one or more of an interior surface or an exterior surface of the conduit.

Embodiment 11. The stomach simulating device of embodiment 10, wherein the conduit comprises a second plurality of ribs, wherein the first plurality of ribs are closer to the inlet portion than the outlet portion of the conduit and the second plurality of ribs are closer to the outlet portion than the inlet portion of the conduit, wherein the first plurality of ribs is greater than the second plurality of ribs.

Embodiment 12. The stomach simulating device of embodiment 11, wherein the first plurality of ribs comprises from 3-15 ribs and the second plurality of ribs comprises from 3-15 ribs.

Embodiment 13. The stomach simulating device of embodiment 11 or 12, wherein the first plurality of ribs comprises from 8-15 ribs and the second plurality of ribs comprises from 3-10 ribs.

Embodiment 14. The stomach simulating device of any of embodiments 1-13, wherein a material of the conduit comprises at least one of a silicone having a durometer of Shore 10 to 90A, a silicone having a durometer of Shore 00-30, and a silicone having a durometer of Shore 18A when measured using ASTM D2240.

Embodiment 15. The stomach simulating device of any of embodiments 1-14, wherein the mechanical constrictor is configured to move longitudinally in a direction from the inlet portion to the outlet portion of the conduit.

Embodiment 16. The stomach simulating device of any of embodiments 1-15, wherein the mechanical constrictor is configured to move longitudinally in a direction from the inlet portion to the outlet portion of the conduit by pivoting at a fixed point.

Embodiment 17. The stomach simulating device of any of embodiments 1-16, wherein the mechanical constrictor is configured to move longitudinally in a direction from the inlet portion to the outlet portion of the conduit at a velocity from 1.0 mm/s to 20 mm/s.

Embodiment 18. The stomach simulating device of any of embodiments 1-17, wherein the mechanical constrictor is configured to concentrically constrict the conduit.

Embodiment 19. The stomach simulating device of any of embodiments 1-18, wherein the mechanical constrictor is configured to constrict the conduit by applying a force to a side of the conduit.

Embodiment 20. The stomach simulating device of any of embodiments 1-19, wherein the mechanical constrictor is configured to apply a 5-75 kPa of pressure when constricting the conduit.

Embodiment 21. The stomach simulating device of any of embodiments 1-20, wherein the mechanical constrictor comprises a bearing snake mechanism.

Embodiment 22. The stomach simulating device of any of embodiments 1-21, wherein the valve comprises a circumferential valve.

Embodiment 23. The stomach simulating device of any of embodiments 1-22, wherein the valve is configured to completely constrict the portion of the conduit closer to the outlet portion than the inlet portion of the conduit.

Embodiment 24. The stomach simulating device of any of embodiments 1-23, wherein operation of the mechanical constrictor and operation of the valve are coordinated.

Embodiment 25. A stomach conduit for a stomach simulating device comprising: a body portion; a first diameter at an inlet portion; and a second diameter at an outlet portion, wherein the first diameter at the inlet portion is greater than the second diameter at the outlet portion, the body portion is located between the inlet portion and the outlet portion, and at least a portion of the conduit is curved in a direction from the inlet portion the outlet portion.

Embodiment 26. The stomach conduit of embodiment 25, wherein the conduit comprises a i-shape.

Embodiment 27. The stomach conduit of embodiment 25 or 26, wherein the conduit comprises silicone.

Embodiment 28. The stomach conduit of any of embodiments 25-27, wherein a top opening of the conduit comprises a diameter of 3.0-8.0 inches.

Embodiment 29. The stomach conduit of any of embodiments 25-28, wherein the conduit comprises a minimum diameter in an unconstricted conduit of 0.25-2.0 inches.

Embodiment 30 The stomach conduit of any of embodiments 25-29, wherein the conduit comprises a wall thickness of 1-15 mm.

Embodiment 31. The stomach conduit of any of embodiments 25-30, wherein a diameter of the conduit continuously decreases in a direction from the inlet portion to the outlet portion.

Embodiment 32. The stomach conduit of any of embodiments 25-31, wherein the inlet portion of the conduit comprises a constant diameter from a first location to a second location of the conduit.

Embodiment 33. The stomach conduit of any of embodiments 25-32, wherein the outlet portion of the conduit comprises a constant diameter from a third location to a fourth location of the conduit.

Embodiment 34. The stomach conduit of any of embodiments 25-33, wherein the conduit comprises a first plurality of ribs along one or more of an interior surface or an exterior surface of the conduit.

Embodiment 35. The stomach conduit of embodiment 34, wherein the conduit comprises a second plurality of ribs, wherein the first plurality of ribs are closer to the inlet portion than the outlet portion of the conduit and the second plurality of ribs are closer to the outlet portion than the inlet portion of the conduit, wherein the first plurality of ribs is greater than the second plurality of ribs.

Embodiment 36. The stomach conduit of embodiment 35, wherein the first plurality of ribs comprises from 3-15 ribs and the second plurality of ribs comprises from 3-15 ribs.

Embodiment 37. The stomach conduit of embodiment 35 or 36, wherein the first plurality of ribs comprises from 8-15 ribs and the second plurality of ribs comprises from 3-10 ribs.

Embodiment 38. The stomach conduit of any of embodiments 25-37, wherein a material of the conduit comprises a durometer of 10 to 90A when measured using ASTM D2240.

Embodiment 39. A stomach simulating device comprising: a conduit having a body portion, a first diameter at an inlet portion, and a second diameter at an outlet portion, wherein the first diameter at the inlet portion is located between the inlet portion and the outlet portion, and at least a portion of the conduit is curved in a direction from the inlet portion the outlet portion, and a mechanical constrictor configured to constrict at least a portion of the body portion of the conduit.

Embodiment 40. The stomach simulating device of embodiment 39, wherein the conduit comprises a J-shape.

Embodiment 41. The stomach simulating device of embodiment 39 or 40, wherein the conduit comprises silicone.

Embodiment 42. The stomach simulating device of any of embodiments 39-41, wherein a top opening of the conduit comprises a diameter of 3.0-8.0 inches.

Embodiment 43. The stomach simulating device of any of embodiments 39-42, wherein the conduit comprises a minimum diameter in an unconstricted conduit of 0.25-2.0 inches.

Embodiment 44. The stomach simulating device of any of embodiments 39-43, wherein the conduit comprises a wall thickness of 1-15 mm.

Embodiment 45. The stomach simulating device of any of embodiments 39-44, wherein a diameter of the conduit continuously decreases in a direction from the inlet portion to the outlet portion.

Embodiment 46. The stomach simulating device of any of embodiments 39-45, wherein the inlet portion of the conduit comprises a constant diameter from a first location to a second location of the conduit.

Embodiment 47. The stomach simulating device of any of embodiments 39-46, wherein the outlet portion of the conduit comprises a constant diameter from a third location to a fourth location of the conduit.

Embodiment 48. The stomach simulating device of any of embodiments 39-47, wherein the conduit comprises a first plurality of ribs along one or more of an interior surface or an exterior surface of the conduit.

Embodiment 49. The stomach simulating; device of embodiment 48, wherein the conduit comprises a second plurality of ribs, wherein the first plurality of ribs are closer to the inlet portion than the outlet portion of the conduit and the second plurality of ribs are closer to the outlet portion than the inlet portion of the conduit, wherein the first plurality of ribs is greater than the second plurality of ribs.

Embodiment 50. The stomach simulating device of embodiment 49, wherein the first plurality of ribs comprises from 3-15 ribs and the second plurality of ribs comprises from 3-15 ribs.

Embodiment 51. The stomach simulating device of embodiment 48 or 49, wherein the first plurality of ribs comprises from 8-15 ribs and the second plurality of ribs comprises from 3-10 ribs.

Embodiment 52. The stomach simulating device of any of embodiments 39-51, wherein a material of the conduit comprises a durometer of 10 to 90A when measured using ASTM D2240.

Embodiment 53. The stomach simulating device of any of embodiments 39-52, wherein the mechanical constrictor is configured to move longitudinally in a direction from the inlet portion to the outlet portion of the conduit.

Embodiment 54. The stomach simulating device of any of embodiments 39-53, wherein the mechanical constrictor is configured to move longitudinally in a direction from the inlet portion to the outlet portion of the conduit by pivoting at a fixed point.

Embodiment 55. The stomach simulating device of any of embodiments 39-54, wherein the mechanical constrictor is configured to move longitudinally in a direction from the inlet portion to the outlet portion of the conduit at a velocity from 1.0 mm/s to 20 mm/s.

Embodiment 56. The stomach simulating device of any of embodiments 39-55, wherein the mechanical constrictor is configured to concentrically constrict the conduit.

Embodiment 57. The stomach simulating device of any of embodiments 39-56, wherein the mechanical constrictor is configured to constrict the conduit by applying a force to a side of the conduit.

Embodiment 58. The stomach simulating device of any of embodiments 39-57, wherein the mechanical constrictor is configured to apply a 5-75 kPa of pressure when constricting the conduit.

Embodiment 59. The stomach simulating device of any of embodiments 39-58, wherein the mechanical constrictor comprises a bearing snake mechanism.

Embodiment 60. A stomach simulating device comprising: a conduit having a body portion, a first diameter at an inlet portion, and a second diameter at an outlet portion, wherein the first diameter at the inlet portion is greater than the second diameter at the outlet portion, the body portion is located between the inlet portion and the outlet portion, and at least a portion of the conduit is curved in a direction from the inlet portion to the outlet portion; and a valve configured to at least partially close a portion of the conduit closer to the outlet portion than the inlet portion of the conduit.

Embodiment 61. The stomach simulating device of embodiment 60, wherein the conduit comprises a J-shape.

Embodiment 62. The stomach simulating device of embodiment 60 or 61, wherein the conduit comprises silicone.

Embodiment 63. The stomach simulating device of any of embodiments 60-62, wherein a top opening of the conduit comprises a diameter of 3.0-8.0 inches.

Embodiment 64. The stomach simulating device of any of embodiments 60-63, wherein the conduit comprises a minimum diameter in an unconstricted conduit of 0.25-2.0 inches.

Embodiment 65. The stomach simulating device of any of embodiments 60-64, wherein the conduit comprises a wall thickness of 1-15 mm.

Embodiment 66. The stomach simulating device of any of embodiments 60-65, wherein a diameter of the conduit continuously decreases in a direction from the inlet portion to the outlet portion.

Embodiment 67. The stomach simulating device of any of embodiments 60-66, wherein the inlet portion of the conduit comprises a constant diameter from a first location to a second location of the conduit.

Embodiment 68. The stomach simulating device of any of embodiments 60-67, wherein the outlet portion of the conduit comprises a constant diameter from a third location to a fourth location of the conduit.

Embodiment 69. The stomach simulating device of any of embodiments 60-68, wherein the conduit comprises a first plurality of ribs along one or more of an interior surface or an exterior surface of the conduit.

Embodiment 70. The stomach simulating device of embodiment 69, wherein the conduit comprises a second plurality of ribs, wherein the first plurality of ribs are closer to the inlet portion than the outlet portion of the conduit and the second plurality of ribs are closer to the outlet portion than the inlet portion of the conduit, wherein the first plurality of ribs is greater than the second plurality of ribs.

Embodiment 71. The stomach simulating device of embodiment 70, wherein the first plurality of ribs comprises from 3-15 ribs and the second plurality of ribs comprises from 3-15 ribs.

Embodiment 72. The stomach simulating device of embodiment 69 or 70, wherein the first plurality of ribs comprises from 8-15 ribs and the second plurality of ribs comprises from 3-10 ribs.

Embodiment 73. The stomach simulating device of any of embodiments 60-72, wherein a material of the conduit comprises a durometer of 10 to 90A when measured using ASTM D2240.

Embodiment 74. The stomach simulating device of any of embodiments 60-73, wherein the mechanical constrictor is configured to move longitudinally in a direction from the inlet portion to the outlet portion of the conduit.

Embodiment 75. The stomach simulating device of any of embodiments 60-74, wherein the mechanical constrictor is configured to move longitudinally in a direction from the inlet portion to the outlet portion of the conduit by pivoting at a fixed point.

Embodiment 76. The stomach simulating device of any of embodiments 60-75, wherein the mechanical constrictor is configured to move longitudinally in a direction from the inlet portion to the outlet portion of the conduit at a velocity from 1.0 mm/s to 20 mm/s.

Embodiment 77. The stomach simulating device of any of embodiments 60-76, wherein the mechanical constrictor is configured to concentrically constrict the conduit.

Embodiment 78. The stomach simulating device of any of embodiments 60-77, wherein the mechanical constrictor is configured to constrict the conduit by applying a force to a side of the conduit.

Embodiment 79. The stomach simulating device of any of embodiments 60-78, wherein the mechanical constrictor is configured to apply a 5-75 kPa of pressure when constricting the conduit.

Embodiment 80. The stomach simulating device of any of embodiments 60-79, wherein the mechanical constrictor comprises a bearing snake mechanism.

Embodiment 81. The stomach simulating device of any of embodiments 60-80, wherein the valve comprises a circumferential valve.

Embodiment 82. The stomach simulating device of any of embodiments 60-81, wherein the valve is configured to completely constrict the portion of the conduit closer to the outlet portion than the inlet portion of the conduit.

Embodiment 83. The stomach simulating device of any of embodiments 60-82, wherein operation of the mechanical constrictor and operation of the valve are coordinated.

Embodiment 84. A method of simulating a stomach comprising: inserting a dosage form to be tested into an inlet portion of a conduit, the conduit having a body portion located between the inlet portion and an outlet portion, wherein at least a portion of the conduit is curved in a direction from the inlet portion the outlet portion; applying a radial force to the conduit while the dosage form is in the conduit and a valve at least partially constricts a portion of the conduit closer to the outlet portion than the inlet portion of the conduit.

Embodiment 85. The method of embodiment 84, comprising determining a residence time of the dosage form, wherein the residence time is the time between administration of the dosage form to the stomach hag and exit of the dosage form from the stomach bag of a stomach simulating device simulating a real stomach under non-accelerated conditions.

Embodiment 86. The method of embodiment 85, wherein the residence time is greater than 6 hours.

Embodiment 87. The method of embodiment 85 or 86, wherein the residence time is greater than 12 hours.

Embodiment 88. The method of any of embodiments 85-87, wherein the residence time is greater than 18 hours.

Embodiment 89. The method of any of embodiments 85-88, wherein the residence time is greater than 1 day.

Embodiment 90. The method of any of embodiments 85-89, wherein the residence time is greater than 1 week.

Embodiment 91. The method of any of embodiments 84-90; wherein method simulates multiple digestive cycles.

Embodiment 92. The method of any of embodiments 84-91, wherein applying a radial three to the conduit comprises applying a three to a side of the conduit.

Embodiment 93. The method of any of embodiments 84-92; wherein applying a radial force to the conduit comprises concentrically constricting the conduit.

Embodiment 94. The method of any of embodiments 84-93, wherein applying a radial force to the conduit comprises using a mechanical constrictor.

Embodiment 95. The method of embodiment 94, comprising moving the mechanical constrictor in a longitudinal direction from the inlet portion to the outlet portion of the conduit.

Embodiment 96. The method of any of embodiments 84-95, wherein the valve comprises a circumferential valve.

Embodiment 97. The method of any of embodiments 84-96, wherein the valve is configured to completely constrict the portion of the conduit closer to the outlet portion than the inlet portion of the conduit.

Embodiment 98. The method of any of embodiments 84-97, wherein applying a radial force to the conduit comprises coordinating the radial force and the valve operation.

Embodiment 99. The method of any of embodiments 84-98, wherein the dosage form is a gastroretentive dosage form.

Embodiment 100. The method of any of embodiments 84-99, wherein the dosage form comprises an active pharmaceutical ingredient.

Embodiment 101. A stomach simulating device comprising: a conduit having a body portion, a first inner diameter, and a second inner diameter, and an outer diameter, wherein the first inner diameter is larger than the second inner diameter; and a plurality of cable constrictors, wherein each cable constrictor of the plurality of cable constrictors is configured to constrict a portion of the body portion of the conduit.

Embodiment 102. The stomach simulating device f embodiment 101, wherein an exterior surface of the conduit is cylindrical.

Embodiment 103. The stomach simulating device of embodiment 101 or 102, wherein the conduit comprises silicone.

Embodiment 104. The stomach simulating device of any of embodiments 101-103, wherein an opening of the conduit comprises a diameter of 30-60 mm.

Embodiment 105. The stomach simulating device of any of embodiments 101-104, wherein the conduit comprises a minimum diameter in an unconstricted conduit of 15-30 mm.

Embodiment 106. The stomach simulating device of any of embodiments 101-105, wherein the conduit comprises a wall thickness of 1-15 mm.

Embodiment 107. The stomach simulating device of any of embodiments 101-106, wherein the conduit comprises a plurality of circumferential channels along the exterior surface.

Embodiment 108. The stomach simulating device of any of embodiments 101-107, wherein a first cable constrictor of the plurality of cable constrictors wraps around an exterior circumference of the conduit.

Embodiment 109. The stomach simulating device of embodiment 108, wherein the first cable constrictor is positioned within a first circumferential channel.

Embodiment 110. The stomach simulating device of any of embodiments 101-109, wherein the plurality of cable constrictors is bonded to the stomach bag with silicone.

Embodiment 111. The stomach simulating device of any of embodiments 101-110, wherein the plurality of cable constrictors comprises 10-20 cable constrictors.

Embodiment 112. The stomach simulating device of any of embodiments 101-111, wherein the conduit comprises a first silicone of durometer 00-30 and a second silicone of durometer 18A as measured using ASTM D2240.

Embodiment 113. The stomach simulating device of any of embodiments 101-112, wherein each cable constrictor of the plurality of cable constrictors comprises a looped steel wire wrapped with a polyester rope, and each cable constrictor is configured to concentrically constrict a portion of the body portion of the conduit when the circumference of the steel wire decreases.

Embodiment 114. The stomach simulating device of any of embodiments 101-113, wherein the cable constrictor is configured to concentrically constrict the conduit when one or more ends of the looped steel wire are pulled to decrease the circumference of the steel wire.

Embodiment 115. The stomach simulating device of any of embodiments 101-114, wherein constriction of each cable constrictor of the plurality of cable constrictors is coordinated.

Embodiment 116. The stomach simulating device of any of embodiments 01-115, wherein the stomach bag is configured to rotate from a horizontal position to a vertical position, and from the vertical position to the horizontal position.

Unless defined otherwise, all terms of art, notations and other technical and scientific ems or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X".

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A stomach simulating device comprising:
a conduit having a body portion, a first inner diameter, and a second inner diameter, and an outer diameter, wherein the first inner diameter is larger than the second inner diameter, and wherein the conduit comprises a plurality of circumferential channels along an exterior surface; and
a plurality of cable constrictors, wherein each cable constrictor of the plurality of cable constrictors is configured to constrict a portion of the body portion of the conduit.

2. The stomach simulating device of claim 1, wherein an exterior surface of the conduit is cylindrical.

3. The stomach simulating device of claim 1, wherein the conduit comprises silicone.

4. The stomach simulating device of claim 1, wherein an opening of the conduit comprises a diameter of 30-60 mm.

5. The stomach simulating device of claim 1, wherein the conduit comprises a minimum diameter in an unconstricted conduit of 15-30 mm.

6. The stomach simulating device of claim 1, wherein the conduit comprises a wall thickness of 1-15 mm.

7. The stomach simulating device of claim 1, wherein a first cable constrictor of the plurality of cable constrictors wraps around an exterior circumference of the conduit.

8. The stomach simulating device of claim 7, wherein the first cable constrictor is positioned within a first circumferential channel.

9. The stomach simulating device of claim 1, wherein the plurality of cable constrictors is bonded to the stomach bag conduit with silicone.

10. The stomach simulating device of claim 1, wherein the plurality of cable constrictors comprises 10-20 cable constrictors.

11. The stomach simulating device of claim 1, wherein the conduit comprises a first silicone of durometer 00-30 and a second silicone of durometer 18A as measured using ASTM D2240.

12. The stomach simulating device of claim 1, wherein each cable constrictor of the plurality of cable constrictors comprises a looped steel wire wrapped with a polyester rope, and each cable constrictor is configured to concentrically constrict a portion of the body portion of the conduit when a circumference of the steel wire decreases.

13. The stomach simulating device of claim 1, wherein each cable constrictor is configured to concentrically constrict the conduit when one or more ends of a looped steel wire are pulled to decrease a circumference of the looped steel wire.

14. The stomach simulating device of claim 1, wherein constriction of each cable constrictor of the plurality of cable constrictors is coordinated.

15. The stomach simulating device of claim 1, wherein the conduit is configured to rotate from a horizontal position to a vertical position, and from the vertical position to the horizontal position.

16. The stomach simulating device of claim 1, wherein a lubricant is applied to an interior surface of the conduit.

17. A stomach simulating device comprising:
a conduit having a body portion, a first inner diameter, and a second inner diameter, and an outer diameter, wherein the first inner diameter is larger than the second inner diameter; and
a plurality of cable constrictors, wherein each cable constrictor of the plurality of cable constrictors is configured to constrict a portion of the body portion of the conduit, wherein a first cable constrictor of the plurality of cable constrictors wraps around an exterior surface of the conduit, wherein the first cable constrictor is positioned within a first circumferential channel.

18. The stomach simulating device of claim 17, wherein the conduit comprises a plurality of circumferential channels along an exterior surface.

19. The stomach simulating device of claim 17, wherein each cable constrictor of the plurality of cable constrictors comprises a looped steel wire wrapped with a polyester rope, and each cable constrictor is configured to concentrically constrict a portion of the body portion of the conduit when a circumference of the looped steel wire decreases.

20. The stomach simulating device of claim 17, wherein constriction of each cable constrictor of the plurality of cable constrictors is coordinated.

* * * * *